US011539042B2

(12) United States Patent
Harutyunyan

(10) Patent No.: US 11,539,042 B2
(45) Date of Patent: Dec. 27, 2022

(54) FLEXIBLE PACKAGING WITH EMBEDDED ELECTRODE AND METHOD OF MAKING

(71) Applicant: HONDA MOTOR CO., LTD., Tokyo (JP)

(72) Inventor: Avetik R. Harutyunyan, Santa Clara, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 272 days.

(21) Appl. No.: 16/517,288

(22) Filed: Jul. 19, 2019

(65) Prior Publication Data

US 2021/0020914 A1    Jan. 21, 2021

(51) Int. Cl.

| H01M 4/1393 | (2010.01) |
|---|---|
| H01M 4/133 | (2010.01) |
| H01M 4/1395 | (2010.01) |
| H01M 4/134 | (2010.01) |
| H01M 4/1391 | (2010.01) |
| H01M 4/131 | (2010.01) |
| H01M 50/116 | (2021.01) |
| H01M 50/105 | (2021.01) |
| H01M 4/62 | (2006.01) |

(Continued)

(52) U.S. Cl.
CPC ......... *H01M 4/1393* (2013.01); *H01M 4/131* (2013.01); *H01M 4/133* (2013.01); *H01M 4/134* (2013.01); *H01M 4/1391* (2013.01); *H01M 4/1395* (2013.01); *H01M 50/116* (2021.01); *H01M 4/0435* (2013.01); *H01M 4/0471* (2013.01); *H01M 4/62* (2013.01); *H01M 4/625* (2013.01); *H01M 50/105* (2021.01); *H01M 50/136* (2021.01)

(58) Field of Classification Search
None
See application file for complete search history.

(56) References Cited

U.S. PATENT DOCUMENTS

| 3,513,034 A | 5/1970 | Fischbach et al. |
|---|---|---|
| 3,772,084 A | 11/1973 | Scholle |
| 5,985,175 A | 11/1999 | Fan et al. |

(Continued)

FOREIGN PATENT DOCUMENTS

| CN | 1922347 A | 2/2007 |
|---|---|---|
| CN | 1972739 A | 5/2007 |

(Continued)

OTHER PUBLICATIONS

Notice of Reasons for Rejection dated Aug. 17, 2021, from the Japanese Patent Office in related application No. 2020-002545.
(Continued)

*Primary Examiner* — Ula C Ruddock
*Assistant Examiner* — Matthew W Van Oudenaren
(74) *Attorney, Agent, or Firm* — ArentFox Schiff LLP; Mark Duell

(57) ABSTRACT

The present disclosure relates to a method of making carbon nanotube supported self-standing electrodes embedded in a polymer based battery packaging material. The present disclosure further relates to a method of continuously making carbon nanotube supported self-standing electrodes embedded in a polymer based battery packaging material. The resulting self-standing electrodes may be used in a wearable and flexible battery.

32 Claims, 9 Drawing Sheets

(51) Int. Cl.
*H01M 4/04* (2006.01)
*H01M 50/136* (2021.01)

(56) References Cited

U.S. PATENT DOCUMENTS

| | | |
|---|---|---|
| 7,094,385 B2 | 8/2006 | Beguin et al. |
| 7,288,870 B2 | 10/2007 | Mitcham et al. |
| 7,348,101 B2 | 3/2008 | Gozdz et al. |
| 7,622,059 B2 | 11/2009 | Bordere et al. |
| 7,999,028 B2 | 8/2011 | Lin et al. |
| 8,083,905 B2 | 12/2011 | Choi et al. |
| 8,084,158 B2 | 12/2011 | Chu et al. |
| 8,293,204 B2 | 10/2012 | Khodadadi et al. |
| 8,435,676 B2 | 5/2013 | Zhamu et al. |
| 8,465,871 B2 | 6/2013 | Juzkow et al. |
| 8,628,747 B2 | 1/2014 | Zachariah et al. |
| 8,703,092 B2 | 4/2014 | Ziegler |
| 8,787,001 B2 | 7/2014 | Fleischer et al. |
| 8,825,178 B2 | 9/2014 | Feng et al. |
| 8,883,113 B2 | 11/2014 | Richter et al. |
| 8,974,960 B2 | 3/2015 | Manthiram et al. |
| 8,986,872 B2 | 3/2015 | Lev et al. |
| 9,034,421 B2 | 5/2015 | Mikhaylik et al. |
| 9,167,736 B2 | 10/2015 | Shah et al. |
| 9,396,829 B2 | 7/2016 | Mann et al. |
| 9,406,985 B2 | 8/2016 | Amaratunga |
| 9,450,266 B2 | 9/2016 | Hosaka et al. |
| 9,502,734 B1 | 11/2016 | Um et al. |
| 9,615,473 B2 | 4/2017 | Kim |
| 9,692,056 B1 | 6/2017 | Liu et al. |
| 9,711,763 B2 | 7/2017 | Sohn et al. |
| 9,782,082 B2 | 10/2017 | Gannon et al. |
| 9,786,872 B2 | 10/2017 | Suh et al. |
| 9,807,876 B2 | 10/2017 | Catchpole |
| 9,812,681 B2 | 11/2017 | Heo |
| 9,869,586 B2 | 1/2018 | Suh et al. |
| 9,887,644 B2 | 2/2018 | Kim et al. |
| 9,941,492 B2 | 4/2018 | Suh et al. |
| 9,972,868 B2 | 5/2018 | Choi et al. |
| 9,979,225 B2 | 5/2018 | Bernhard |
| 10,033,031 B2 | 7/2018 | Wang et al. |
| 10,090,556 B2 | 10/2018 | Rho et al. |
| 10,096,803 B2 | 10/2018 | Iseri et al. |
| 10,122,010 B2 | 11/2018 | Tajima et al. |
| 10,147,915 B2 | 12/2018 | Song et al. |
| 10,199,851 B2 | 2/2019 | Hiroki et al. |
| 10,217,971 B2 | 2/2019 | Takahashi et al. |
| 10,957,939 B2 | 3/2021 | Zhi et al. |
| 2003/0084847 A1 | 5/2003 | Wood et al. |
| 2003/0099883 A1 | 5/2003 | Ochoa et al. |
| 2004/0086783 A1 | 5/2004 | Fong et al. |
| 2004/0234445 A1 | 11/2004 | Serp et al. |
| 2005/0008778 A1 | 1/2005 | Utsugi et al. |
| 2005/0063891 A1 | 3/2005 | Shaffer et al. |
| 2005/0148887 A1 | 7/2005 | Reiter et al. |
| 2005/0209392 A1 | 9/2005 | Luo et al. |
| 2005/0221185 A1 | 10/2005 | Sakata et al. |
| 2006/0039849 A1 | 2/2006 | Resasco et al. |
| 2006/0078489 A1 | 4/2006 | Harutyunyan et al. |
| 2006/0116443 A1 | 6/2006 | Probst et al. |
| 2006/0151318 A1 | 7/2006 | Park et al. |
| 2006/0245996 A1 | 11/2006 | Xie et al. |
| 2007/0224106 A1 | 9/2007 | Sakakibara et al. |
| 2007/0274899 A1 | 11/2007 | Wolf et al. |
| 2008/0131351 A1 | 6/2008 | Wang et al. |
| 2008/0210550 A1 | 9/2008 | Walther et al. |
| 2008/0233402 A1 | 9/2008 | Carlson et al. |
| 2008/0258117 A1 | 10/2008 | Sakakibara et al. |
| 2009/0117026 A1 | 5/2009 | Shimazu et al. |
| 2009/0142659 A1 | 6/2009 | Lai et al. |
| 2009/0208708 A1 | 8/2009 | Wei et al. |
| 2009/0226704 A1 | 9/2009 | Kauppinen et al. |
| 2009/0274609 A1 | 11/2009 | Harutyunyan et al. |
| 2009/0286675 A1 | 11/2009 | Wei et al. |
| 2010/0000441 A1 | 1/2010 | Jang et al. |
| 2010/0038602 A1 | 2/2010 | Plee |
| 2010/0112443 A1 | 5/2010 | Blomgren et al. |
| 2010/0140560 A1* | 6/2010 | Wang ............... B82Y 40/00 261/78.1 |
| 2010/0178543 A1 | 7/2010 | Gruner et al. |
| 2010/0221606 A1 | 9/2010 | Nalamasu et al. |
| 2010/0276644 A1 | 11/2010 | Wolf et al. |
| 2010/0285352 A1 | 11/2010 | Juzkow et al. |
| 2010/0285358 A1 | 11/2010 | Cui et al. |
| 2011/0060162 A1 | 3/2011 | Tatsuhara et al. |
| 2011/0096465 A1 | 4/2011 | Zhou et al. |
| 2011/0111279 A1 | 5/2011 | Smithyman et al. |
| 2011/0123429 A1 | 5/2011 | Bordere et al. |
| 2011/0150746 A1 | 6/2011 | Khodadadi et al. |
| 2011/0158892 A1 | 6/2011 | Yamaki |
| 2011/0171398 A1 | 7/2011 | Oladeji |
| 2011/0177393 A1 | 7/2011 | Park et al. |
| 2011/0281156 A1 | 11/2011 | Boren et al. |
| 2011/0311874 A1 | 12/2011 | Zhou et al. |
| 2012/0105370 A1 | 5/2012 | Moore |
| 2012/0107683 A1 | 5/2012 | Kim et al. |
| 2012/0121986 A1* | 5/2012 | Balu ............... H01M 4/625 977/948 |
| 2012/0132861 A1 | 5/2012 | Tamamitsu et al. |
| 2012/0138148 A1 | 6/2012 | Harutyunyan |
| 2012/0141864 A1 | 6/2012 | Juzkow et al. |
| 2012/0149824 A1 | 6/2012 | Hocke et al. |
| 2012/0156034 A1 | 6/2012 | Sabannavar et al. |
| 2012/0177934 A1 | 7/2012 | Vogel et al. |
| 2012/0193602 A1 | 8/2012 | Lieber et al. |
| 2012/0219490 A1 | 8/2012 | Noda et al. |
| 2012/0241666 A1 | 9/2012 | Hong et al. |
| 2012/0282522 A1 | 11/2012 | Axelbaum et al. |
| 2012/0295161 A1 | 11/2012 | Wang et al. |
| 2012/0315539 A1 | 12/2012 | Lashmore et al. |
| 2012/0321911 A1 | 12/2012 | Watanabe et al. |
| 2013/0040229 A1 | 2/2013 | Grigorian et al. |
| 2013/0065125 A1 | 3/2013 | Sawaki et al. |
| 2013/0065130 A1 | 3/2013 | Ban et al. |
| 2013/0106026 A1 | 5/2013 | Wang et al. |
| 2013/0143077 A1 | 6/2013 | Yebka et al. |
| 2013/0149440 A1 | 6/2013 | Pyzik et al. |
| 2013/0171485 A1 | 7/2013 | Kodera et al. |
| 2013/0171496 A1 | 7/2013 | Wang et al. |
| 2013/0189565 A1 | 7/2013 | Lashmore et al. |
| 2013/0224551 A1 | 8/2013 | Hiralal et al. |
| 2013/0256011 A1 | 10/2013 | Chang et al. |
| 2013/0323583 A1 | 12/2013 | Phares |
| 2014/0005960 A1 | 1/2014 | Anderson et al. |
| 2014/0013588 A1 | 1/2014 | Wang et al. |
| 2014/0021403 A1 | 1/2014 | Kim et al. |
| 2014/0057178 A1 | 2/2014 | He et al. |
| 2014/0065447 A1 | 3/2014 | Liu et al. |
| 2014/0093769 A1 | 4/2014 | Busnaina et al. |
| 2014/0141248 A1 | 5/2014 | Noyes |
| 2014/0170490 A1 | 6/2014 | Izuhara et al. |
| 2014/0178543 A1 | 6/2014 | Russell et al. |
| 2014/0255782 A1 | 9/2014 | Jabbour et al. |
| 2014/0287304 A1 | 9/2014 | Netz |
| 2014/0326181 A1 | 11/2014 | Kim |
| 2014/0370347 A1 | 12/2014 | Jung et al. |
| 2015/0000107 A1 | 1/2015 | Aria et al. |
| 2015/0037239 A1 | 2/2015 | Sue et al. |
| 2015/0044581 A1 | 2/2015 | Holme et al. |
| 2015/0059571 A1 | 3/2015 | Denton et al. |
| 2015/0064521 A1 | 3/2015 | Watanabe et al. |
| 2015/0087858 A1 | 3/2015 | Ci et al. |
| 2015/0133569 A1 | 5/2015 | Gong et al. |
| 2015/0188112 A1 | 7/2015 | Adre et al. |
| 2015/0200417 A1 | 7/2015 | Song et al. |
| 2015/0207143 A1 | 7/2015 | Wu et al. |
| 2015/0207168 A1 | 7/2015 | Do et al. |
| 2015/0233010 A1 | 8/2015 | Pan et al. |
| 2015/0236366 A1 | 8/2015 | Chang et al. |
| 2015/0243451 A1 | 8/2015 | Kim et al. |
| 2015/0243452 A1 | 8/2015 | Gruner et al. |
| 2015/0255828 A1 | 9/2015 | Momo et al. |
| 2015/0279578 A1 | 10/2015 | Martini et al. |
| 2015/0325820 A1 | 11/2015 | Sohn et al. |

(56) References Cited

U.S. PATENT DOCUMENTS

| | | |
|---|---|---|
| 2015/0333302 A1 | 11/2015 | Johns et al. |
| 2015/0340684 A1 | 11/2015 | Voillequin et al. |
| 2015/0340741 A1 | 11/2015 | Kim et al. |
| 2015/0349325 A1 | 12/2015 | Chen et al. |
| 2015/0364750 A1 | 12/2015 | Maheshwarl et al. |
| 2015/0372344 A1 | 12/2015 | Iwasaki et al. |
| 2015/0380738 A1 | 12/2015 | Zhou et al. |
| 2016/0009557 A1 | 1/2016 | Harutyunyan et al. |
| 2016/0013457 A1 | 1/2016 | Suh et al. |
| 2016/0013458 A1 | 1/2016 | Suh et al. |
| 2016/0020437 A1 | 1/2016 | Sohn et al. |
| 2016/0023905 A1 | 1/2016 | Wei |
| 2016/0036059 A1 | 2/2016 | Tokune et al. |
| 2016/0040780 A1 | 2/2016 | Donahue |
| 2016/0049569 A1 | 2/2016 | Negrin |
| 2016/0079629 A1 | 3/2016 | Abe et al. |
| 2016/0082404 A1* | 3/2016 | Pigos .............. B01J 13/0095 252/78.3 |
| 2016/0094079 A1 | 3/2016 | Hiroki et al. |
| 2016/0126554 A1 | 5/2016 | Beneventi et al. |
| 2016/0149193 A1 | 5/2016 | Seong |
| 2016/0149253 A1 | 5/2016 | Yi et al. |
| 2016/0166837 A1 | 6/2016 | Strommer et al. |
| 2016/0329533 A1 | 11/2016 | Tajima |
| 2016/0365544 A1 | 12/2016 | Lee et al. |
| 2016/0372717 A1 | 12/2016 | Noda |
| 2017/0005504 A1 | 1/2017 | Rho et al. |
| 2017/0018799 A1 | 1/2017 | Jeong |
| 2017/0033326 A1 | 2/2017 | Goto et al. |
| 2017/0040582 A1 | 2/2017 | Kim |
| 2017/0155098 A1 | 6/2017 | Park et al. |
| 2017/0155099 A1 | 6/2017 | Song et al. |
| 2017/0214052 A1 | 7/2017 | Xu |
| 2017/0263972 A1 | 9/2017 | Rho et al. |
| 2017/0288255 A1 | 10/2017 | Kim et al. |
| 2017/0338439 A1 | 11/2017 | Yokoyama |
| 2017/0338449 A1 | 11/2017 | Rho et al. |
| 2017/0338489 A1 | 11/2017 | Miwa et al. |
| 2018/0026236 A1 | 1/2018 | Lee et al. |
| 2018/0062417 A1 | 3/2018 | Choi et al. |
| 2018/0115026 A1 | 4/2018 | Mairs |
| 2018/0240609 A1 | 8/2018 | Park et al. |
| 2018/0241081 A1 | 8/2018 | Deng et al. |
| 2018/0309117 A1 | 10/2018 | Zhu et al. |
| 2019/0027638 A1 | 1/2019 | Masuda et al. |
| 2019/0033602 A1 | 1/2019 | Lee et al. |
| 2019/0036103 A1 | 1/2019 | Pierce et al. |
| 2019/0088925 A1 | 3/2019 | Harutyunyan et al. |
| 2019/0099129 A1 | 4/2019 | Kopelman et al. |
| 2019/0115633 A1 | 4/2019 | Akihisa |
| 2019/0122464 A1 | 4/2019 | Delong et al. |
| 2019/0140270 A1 | 5/2019 | Wang et al. |
| 2019/0171315 A1 | 6/2019 | Park et al. |
| 2019/0237748 A1 | 8/2019 | Shin et al. |
| 2019/0393486 A1 | 12/2019 | He et al. |
| 2020/0264663 A1 | 8/2020 | Kumta et al. |
| 2021/0399289 A1 | 12/2021 | Eshraghi et al. |

FOREIGN PATENT DOCUMENTS

| | | |
|---|---|---|
| CN | 101801394 A | 8/2010 |
| CN | 102047488 A | 5/2011 |
| CN | 102482098 A | 5/2012 |
| CN | 102593436 A | 7/2012 |
| CN | 102674316 A | 9/2012 |
| CN | 103204492 A | 7/2013 |
| CN | 102674316 B | 5/2014 |
| CN | 204072059 U | 1/2015 |
| CN | 104752651 A | 7/2015 |
| CN | 103219467 B | 11/2015 |
| CN | 103715394 B | 1/2016 |
| CN | 205375473 U | 7/2016 |
| CN | 103280846 B | 8/2016 |
| CN | 106024969 A | 10/2016 |
| CN | 205697720 U | 11/2016 |
| CN | 106299237 A | 1/2017 |
| CN | 104392845 B | 3/2017 |
| CN | 104362326 B | 8/2017 |
| CN | 107074534 A | 8/2017 |
| CN | 107086306 A | 8/2017 |
| CN | 107611340 A | 1/2018 |
| CN | 108878717 A | 11/2018 |
| CN | 109088071 A | 12/2018 |
| CN | 208690415 U | 4/2019 |
| CN | 106129536 B | 7/2019 |
| DE | 102017123752 B3 | 3/2019 |
| EP | 2 213 369 A1 | 8/2010 |
| EP | 2 476 648 A1 | 7/2012 |
| EP | 2 835 177 A1 | 2/2015 |
| JP | 6-267515 A | 9/1994 |
| JP | 11-31502 A | 2/1999 |
| JP | 11-87875 A | 3/1999 |
| JP | 2005-272277 A | 10/2005 |
| JP | 2007-49789 A | 2/2007 |
| JP | 2008-305608 A | 12/2008 |
| JP | 2010-277925 A | 12/2010 |
| JP | 2012-512956 A | 6/2012 |
| JP | 2015-105208 A | 6/2015 |
| JP | 2015-521347 A | 7/2015 |
| JP | 2015-220004 A | 12/2015 |
| JP | 2016-25077 A | 2/2016 |
| JP | 2016-31922 A | 3/2016 |
| JP | 2016-54113 A | 4/2016 |
| JP | 2016-73196 A | 5/2016 |
| JP | 2017-130274 A | 7/2017 |
| JP | 2017-147222 A | 8/2017 |
| JP | 2017-162637 A | 9/2017 |
| KR | 10-2007-0001220 A | 1/2007 |
| KR | 10-1548465 B1 | 8/2015 |
| KR | 10-2016-0047643 A | 5/2016 |
| KR | 10-1632109 B1 | 6/2016 |
| KR | 10-2016-0114389 A | 10/2016 |
| KR | 10-2016-0127641 A | 11/2016 |
| KR | 10-2016-0129440 A | 11/2016 |
| KR | 10-2016-0129500 A | 11/2016 |
| KR | 10-1676641 B1 | 11/2016 |
| KR | 10-1703516 B1 | 2/2017 |
| KR | 10-2017-0036478 A | 4/2017 |
| KR | 10-2017-0037510 A | 4/2017 |
| KR | 10-1729702 B1 | 4/2017 |
| KR | 10-1765459 B1 | 8/2017 |
| KR | 10-1795544 B1 | 11/2017 |
| KR | 10-2019-0040554 A | 4/2019 |
| WO | WO 2005/052053 A1 | 6/2005 |
| WO | WO 2005/096089 A1 | 10/2005 |
| WO | WO 2012/156297 A2 | 11/2012 |
| WO | WO 2013/052704 A1 | 4/2013 |
| WO | WO 2014/102131 A2 | 7/2014 |
| WO | WO 2014/153465 A1 | 9/2014 |
| WO | WO 2015/100762 A1 | 7/2015 |
| WO | WO 2016/031335 A1 | 3/2016 |
| WO | WO 2016/178210 A1 | 11/2016 |
| WO | WO 2017/052248 A1 | 3/2017 |
| WO | WO 2017/083566 A1 | 5/2017 |
| WO | WO 2017/120391 A1 | 7/2017 |
| WO | WO 2017/131451 A1 | 8/2017 |
| WO | WO 2018/110933 A1 | 6/2018 |
| WO | WO 2018/194414 A1 | 10/2018 |
| WO | WO 2018/194415 A1 | 10/2018 |
| WO | WO 2019/027147 A1 | 2/2019 |

OTHER PUBLICATIONS

Notification of the First Office Action dated Jul. 16, 2021, from the State Intellectual Property Office of People's Republic of China in related Application No. 201710151455.7.

Communication dated Sep. 26, 2021, issued by the Korean Intellectual Property Office in related Korean Application No. 10-2018-0058433.

Communication dated Jan. 27, 2022, from the State Intellectual Property Office of People's Republic of China in related Application No. 201710150360.3.

(56) References Cited

OTHER PUBLICATIONS

International Search Report and Written Opinion, issued by International Searching Authority in corresponding International Application No. PCT/US19/49923, dated Jan. 23, 2020.
A. Weidenkaff et al. "Metal Nanoparticles for the Production of Carbon Nanotube Composite Materials by Decomposition of Different Carbon Sources" Materials Science and Engineering C, vol. 19, pp. 119-123, 2002.
Chee Howe SEE et al., "CaCO3 Supported Co—Fe Catalysts for Carbon Nanotube Synthesis in Fluidized Bed Reactors" Particle Technology and Fluidization, vol. 54, No. 3, pp. 657-664, Mar. 2008.
Danafar, F. et al., "Fluidized bed catalytic chemical vapor deposition synthesis of carbon nanotubes—A review," The Chemical Engineering Journal, vol. 155, pp. 37-48, 2009.
Dunens, O., et al., "Synthesis of Multiwalled Carbon Nanotubes on Fly Ash Derived Catalysts," Environ. Sci. Technol., vol. 43, pp. 7889-7894, 2009.
Extended European Search Report issued in corresponding European Application No. 18184002.6 dated Nov. 30, 2018.
Extended European Search Report issued in corresponding European Patent Application No. 18194469.5 dated Dec. 4, 2018.
Hasegawa Kei et al., "Lithium Ion Batteries Made of Electrodes with 99 wt% active materials and 1wt% carbon nanotubes without binder or metal foils", Journal of Power Sources, vol. 321, pp. 155-162, 2016.
Hu, Liangbing et al., Thin, Flexible Secondary Li-Ion Paper Batteries, ACS Nano, vol. 4, No. 10, pp. 5843-5848, 2010.
Jenax Inc., Flexible Lithium Polymer Battery J . FLEX, Copyright 2014, (6 Pages Total).
Luo Shu et al., "Binder-Free LIGoO2/Carbon Nanotube Cathodes for High-Performance Lithium Ion Batteries" Advanced Materials, vol. 24, pp. 2294-2298, 2012.
Nanalyze., A Flexible Battery from Blue Spark Technologies, Apr. 8, 2014, (4 Pages Total).
Panasonic Corp., Panasonic Develops Bendable, Twistable, Flexible Lithium-ion Battery, Sep. 29, 2016, (8 Pages Total).
ProLogium Technology Co., Ltd., FLCB Flexible Type LCB, Copyright 2015, (6 Pages Total).
Sarah Maghsoodi et al., "A Novel Continuous Process for Synthesis of Carbon Nanotubes Using Iron Floating Catalyst and MgO Particles for CVD of methane in a fluidized bed reactor" Applied Surface Science, vol. 256, pp. 2769-2774, 2010.
Sebastian Anthony., LG produces the first flexible cable-type lithium-ion battery, ExtremeTech, Aug. 30, 2012, (9 Pages Total).
The Extended European Search Report issued in corresponding European Patent Application No. 18186402.6 dated Oct. 11, 2018.
The Swatch Group Ltd., A revolutionary battery by Belenos: The Watchmaker Swatch Group Has Signed An Agreement With The Chinese Geely Group: For Use Of Its Innovative New Battery., as accessed on May 29, 2019, (3 Pages Total), https://www.swatchgroup.com/en/ swatch-group/innovation-powerhouse/industry-40/revolutionary-battery-belenos.
Vishwam Sankaran., Samsung is reportedly developing a curved battery for its foldable phone, Jul. 4, 2018, (4 Pages Total).
Wang Ke et al., "Super-Aligned Carbon Nanotube Films as Current Collectors for Lightweight and Flexible Lithium Ion Batteries" Advanced Functional Materials, vol. 23, pp. 846-853, 2013.
Xian-Ming Liu et al., "Carbon nanotube (CNT)-based composites as electrode material for rechargeable Li-ion batteries: A review", Composite Science and Technology, vol. 72, pp. 121-144, (2012).
Zhao, M.Q et al., "Towards high purity graphene/single-walled carbon nanotube hybrids with improved electrochemical capacitive performance," Carbon, vol. 54, pp. 403-411, 2013.
Communication dated Nov. 9, 2021, from the Japanese Patent Office in related application No. 2018-172178.
Joo-Seong Kim et al., Supporting Information, A Half Millimeter Thick Coplanar Flexible Battery with Wireless Recharging Capability, Nano Letters 2015 15 (4), 9 Pages Total, (2015).
Xiong Pu et al., "A Self-Charging Power Unit by Integration of a Textile Triboelectric Nanogenerator and a Flexible Lithium-Ion Battery for Wearable Electronics", Advanced Materials 27, pp. 2472-2478, (2015).
International Search Report and Written Opinion, issued by International Searching Authority in related International Application No. PCT/US2020/020993, dated Jul. 2, 2020.
Aminy E. Ostfeld et al., "High-performance flexible energy storage and harvesting system for wearable electronics", www.nature.com/scientificreports, Scientific Reports, 6:26122,DOI:10.1038/srep26122, (2016), (10 Pages Total).
Communication dated Jul. 27, 2021, issued by the Korean Intellectual Property Office in related Korean Application No. 10-2020-0005929.
Sungmook Jung et al., "Wearable Fall Detector using Integrated Sensors and Energy Devices", www.nature.com/scientificreports, Scientific Reports, 5:17081, DOI: 10.1038/srep17081, (2015), (9 Pages Total).
International Search Report and Written Opinion, issued by International Searching Authority in corresponding International Application No. PCT/US2020/039821, dated Sep. 30, 2020.
Communication dated Dec. 22, 2020, from the Japanese Patent Office in counterpart application No. 2020-002026.
David Schiller, "Development of a Stretchable Battery Pack for Wearable Applications", submitted by David Schiller, BSc., Johannes Kepler University Linz, Nov. 2019, 28 Pages Total, https://epub.jku.at/obvulihs/content/titleinfo/4605900/full.pdf.
International Search Report and Written Opinion, issued by International Searching Authority in related International Application No. PCT/US2020/043017, dated Dec. 14, 2020.
A.J. Clancy et al., "A One-Step Route to Solubilised, Purified or Functionalised Single-Walled Carbon Nanotunes", Journal of Materials Chemistry A, pp. 16708-16715, 2015.
Beate Krause et al., "Disperability and Particle Size Distribution of CNTs in an Aqeous Surfactant Dispersion as a Function of Ultrasonic Treatment Time" Carbon 48, pp. 2746-2754, 2010.
Communication dated Aug. 26, 2019, from the European Patent Office in related European Application No. 18186402.6.
Communication dated Feb. 4, 2020, from the European Patent Office in related European Application No. 18 173 644.8.
Communication dated Jul. 31, 2019, from the European Patent Office in related European Application No. 18194454.7.
Extended European Search Report issued in related European Patent Application No. 18173644.8 dated Oct. 12, 2018.
Extended Search Report of related EP Application No. 18 19 4454 dated Jul. 23, 2019.
Howard Wang, "Dispersing Carbon Nanotubes Usuing Surfactants" Current Opinion in Colloid & Interface Science 14, pp. 364-371, 2009.
Linqin Jiang et al., "Production of Aqueous Colloidal Dispersions of Carbon Nanotubes", Journal of Colloid and Interface Science, pp. 89-94, 2003.
Office Action issued by the European Patent Office in related European Patent Application No. 18184002.6, dated May 13, 2020.
O.M. Marago, et al., "Optical trapping of carbon nanotubes", Physica E, 40 (2008), pp. 2347-2351.
Communication dated Jan. 6, 2021, from the Japanese Patent Office in related application No. 2020-002545.
Communication dated Mar. 22, 2022, from the Japanese Patent Office in counterpart application No. 2018-142355.
Ying Shi et al., "Graphene-based integrated electrodes for flexible lithium ion batteries", 2D Materials 2 (2015): 024004. (Year: 2015), (9 Pages Total).
Fenghua Su et al., "High-Performance Two-Ply Yarn Supercapacitors Based on Carbon Nanotube Yarns Dotted with CO3O4 and NiO Nanoparticles", Small 2015, 11, No. 7, pp. 854-861 with Supporting Information(12 Pages Total), www.small-journal.com, (Year: 2015).
Kun Kelvin Fu et al., "Flexible Batteries: From Mechanics to Devices", 2016 American Chemical Society, ACS Publications, ACS Energy Letters 1, pp. 1065-1079, (2016).
Sau Yeh Chew et al., "Flexible free-standing carbon nanotube films for model lithium-ion batteries", Carbon 47, pp. 2976-2983, (2009).

(56) References Cited

OTHER PUBLICATIONS

Sheng Xu et al., "Stretchable batteries with self-similar serpentine interconnects and integrated wireless recharging systems" Nature communications 4:1543, DOI: 10:1038/ncomms2553, 8 Pages Total, (2013).

Shu Luo et al., "Binder-Free LiCoO2/ Carbon Nanotube Cathodes for High-Performance Lithium Ion Batteries", Advanced Materials 24, pp. 2294-2298, (2012).

Zhiqian Wang et al., "Fabrication of High-Performance Flexible Alkaline Batteries by Implementing Multiwalled Carbon Nanotubes and Copolymer Separator" Advanced Materials 26, pp. 970-976, (2014).

Zhiqiang Niu et al., "A "skeleton/skin" strategy for preparing ultrathin free-standing single-walled carbon nanotube/polyaniline films for high performance supercapacitor electrodes", The Royal Society of Chemistry 2012, Energy & Environmental Science 5, pp. 8726-8733, (2012).

Communication issued by the International Searching Authority in corresponding International Application No. PCT/US19/49923, dated Nov. 13, 2019 (PCT/ISA/206).

Communication dated Feb. 23, 2022, from the State Intellectual Property Office of People's Republic of China in Application No. 202010079226.0.

Office Action dated Jun. 28, 2022, issued by the Korean Patent Office in Korean Application No. 10-2022-0057879.

Communication dated Mar. 22, 2022, from the State Intellectual Property Office of People's Republic of China in Application No. 201811076414.7.

Communication dated May 6, 2022, from the State Intellectual Property Office of People's Republic of China in Chinese Application No. 201710150360.3.

Shan Jiang et al., "Series in Science Communication by Chinese Academy of Sciences: Nanometer", Popular Science Press, pp. 155-157, Sep. 2013.(Cited in CN Application No. 201710150360.3, dated May 6, 2022).

Yurong Liu, "Applications of Carbon Materials in Supercapacitor", National Defense Industry Press, (p. 142, 2 pages total), Jan. 2013.(Cited in CN Application No. 201710150360.3, dated May 6, 2022).

First Office Action dated Aug. 25, 2022, from the State Intellectual Property Office of People's Republic of China in Application No. 201810503719.5.

Ling-ling Gu et al., "Preparation and Applications of Carbon Nanotube/Polymer Composites", Polymer Materials Science and Engineering, vol. 25, No. 11, (Nov. 2009), (5 Pages Total, abstract on p. 5).

* cited by examiner

FIG. 1A

Providing an aerosolized mixture of carbon nanotubes and an electrode active material — S100

Depositing the aerosolized mixture to polymer granules supported by porous quartz frits and subsequently heating the polymer/deposited powder composite to form CNT supported self-standing electrodes embedded in the polymer — S101

Optionally, pressing the self-standing electrodes — S102

FLEXIBLE PACKAGING WITH EMBEDDED ELECTRODE AND METHOD OF MAKING

Each of the following applications is hereby incorporated herein by reference in its entirety: U.S. application Ser. No. 15/665,171 filed Jul. 31, 2017 and entitled "Self-Standing Electrodes and Methods for Making Thereof"; U.S. application Ser. No. 16/123,872 filed Sep. 6, 2018 and entitled "Method for Embedding a Battery Tab Attachment in a Self-Standing Electrode Without Current Collector or Binder"; U.S. application Ser. No. 16/123,935 filed Sep. 6, 2018 and entitled "Method for Battery Tab Attachment to a Self-Standing Electrode"; and U.S. application Ser. No. 16/287,621 filed Feb. 27, 2019 and entitled "Method of Making Self-Standing Electrodes Supported by Carbon Nanostructured Filaments".

BACKGROUND

With recent intense developments of wearable devices, healthcare, cosmetics, wearable medical sensors and drug delivery devices, portable electronics, smart packaging, and RFID, among other applications, the development of thin, flexible batteries with high energy density is becoming an essential challenge for providing proper power to the respective devices.

Depending on the device, the batteries should provide the potential not only proper for current electronics (V-range), but also possess energy from $\mu$Wh up to kWh to cover a broad range of applications. However, these new applications, apart from electrical parameters, also require the batteries to be flexible, thin, stretchable, rollable, bendable, and foldable, and to cover micro- and large areas. These features are hard to achieve in typical battery design, where electrodes are printed on current collectors, such as metal foils; and for batteries encapsulated into rigid enclosures, such as coin, cylindrical or prismatic cells.

Flexible batteries should combine large energy density with high tolerance for various types of mechanical forces. Although a battery active material (e.g. Li metal) itself may possess high energy density (43.1 MJ/kg), the energy densities of corresponding primary and secondary batteries are in the range of 1.3-1.8 MJ/kg and 0.36-0.87 MJ/kg, respectively. These order of magnitude losses of the specific energy values are the result of the use of the electrochemically not active components that necessarily comprise current battery architecture, such as metal-based current collectors, separator, electrolyte, binder, conductive additives and packaging. Therefore, exclusion of any of these components could enhance the energy density of the battery. Among them battery-packaging materials or metal foil based current collectors (e.g. Cu for anodes and Al for cathode) have highest impacts due to the values of their high specific densities. In addition, for wearable batteries there is a strong requirement on mechanical flexibility and sustainability under various stresses that arise because of human activities.

Single-walled carbon nanotubes (SWNTs) as additives in various matrices have become one of the most intensively studied areas for applications, owing to their excellent electrical and mechanical properties and high aspect ratio. Among various applications, the exploitation of SWNTs as an additive material for performance enhancement of battery electrodes is very promising. The core of mixing technologies is based on a liquid process and includes five required steps: a) synthesis of nanotubes, b) dispersion of nanotubes in the proper solvent (de-aggregation), c) functionalization of the nanotube surfaces (protecting against aggregation), d) mixing with binder, and e) mixing with active material (preparing slurry). These steps are not only expensive, but they also degrade nanotube properties; for example, dispersion by ball milling, sonication, etc. leads to the inevitable reduction of aspect ratio and the introduction of defects, and as a result, more nanotube loading (weight %) is required for improved performance.

SUMMARY

The following presents a simplified summary of one or more aspects of the present disclosure in order to provide a basic understanding of such aspects. This summary is not an extensive overview of all contemplated aspects and is intended to neither identify key or critical elements of all aspects nor delineate the scope of any or all aspects. Its purpose is to present some concepts of one or more aspects in a simplified form as a prelude to the more detailed description that is presented later.

In some embodiments, the present disclosure is directed to a method of producing a wearable and self-standing electrode, which comprises aerosolizing an electrode active material to produce an aerosolized electrode active material powder; blending the aerosolized electrode active material powder with carbon nanotubes in a carrier gas to form a mixture of carbon nanotubes and the aerosolized electrode active material powder; depositing the mixture on a surface of polymer particles or another suitable form of polymer; and heating the mixture and the polymer to a temperature near the melting point of the polymer to form a wearable and self-standing electrode composite; wherein the polymer is selected from battery packaging materials.

In some embodiments, the present disclosure is directed to a method of continuously producing a wearable and self-standing electrode, which comprises providing an aerosolized mixture of carbon nanotubes and an electrode active material powder; providing a layer of polymer particles, or another suitable form of polymer, supported by a porous substrate; depositing the aerosolized mixture towards the surface of the polymer particles; and heating the aerosolized mixture and the polymer particles to a temperature near the melting point of the polymer to form a wearable and self-standing electrode composite; wherein the polymer is selected from battery packaging materials; and wherein the polymer particles and porous substrate are continuously moving.

Depending on the type of polymer used, treating the mixture and the polymer can supplant or be concurrent with heating, as various self-curing, light-curing, or chemical-curing polymers are known in the art. These and other aspects of the invention will become more fully understood upon a review of the detailed description, which follows.

BRIEF DESCRIPTION OF THE DRAWINGS

The accompanying drawings, together with the specification, illustrate exemplary embodiments, and, together with the description, serve to explain the principles of these embodiments.

FIG. 1A is a schematic block diagram illustrating an exemplary method of making CNT supported self-standing electrodes embedded in the polymer based packaging materials according to an embodiment of the present disclosure.

FIG. 1B is a schematic block diagram illustrating an exemplary method of continuously making CNT supported self-standing electrodes embedded in the polymer based packaging materials according to an embodiment of the present disclosure.

DETAILED DESCRIPTION

Figure 1B:
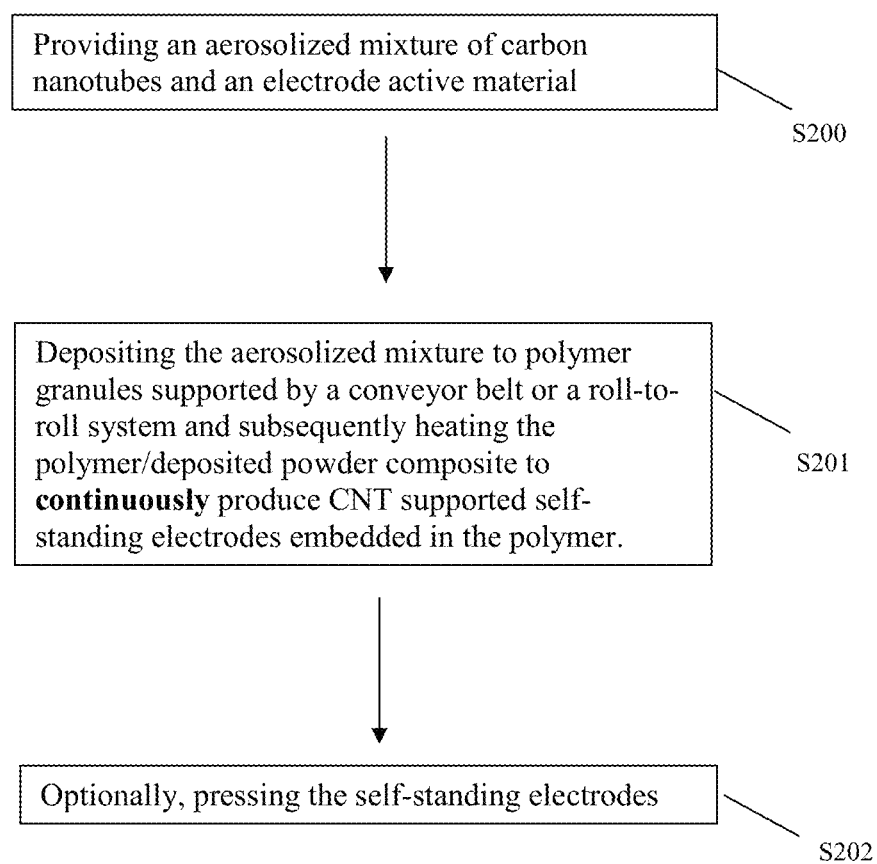

The present disclosure provides a continuous production method for carbon nanotube ("CNT") supported, self-standing electrodes, which are embedded in the polymer based packaging materials. The CNT supported, self-standing electrodes comprise electrode active materials in a network of nanotubes. For example, the network of nanotubes can be an overlaid nanotube network, an interlinked nanotube network, a cross-linked nanotube network, a three-dimensional network, or combinations thereof. Non-limiting examples of methods for production of self-standing electrodes are described in U.S. patent application Ser. Nos. 15/665,171 and 16/287,621, which are incorporated herein by reference in their entirety. Also provided herein are self-standing electrodes for Li-ion batteries comprising a mixture of nanotubes and electrode active materials and batteries comprising various configurations of the electrodes.

In an embodiment, a self-standing electrode is prepared by providing an aerosolized mixture of carbon nanotubes and electrode active materials, and directing the aerosolized mixture to the surface of polymer particles (e.g. polymer flakes, pellets, granules, beads, fabric, or fibers), which are suitable for making battery packaging materials and are supported by a porous substrate. Subsequently, the mixture of CNT/electrode active material/packaging polymer is heated to the temperature close to the melting point of the polymer, which then forms a flexible solid body, to form CNT supported self-standing electrodes embedded in the polymer based battery packaging materials. Instead of or in addition to heating, treating the mixture by any means known in the art, to convert the polymer to a flexible solid body, can be provided to form CNT supported self-standing electrodes embedded in the polymer based battery packaging materials.

In some embodiments, the present disclosure is directed to a method of producing a carbon nanotube supported, self-standing electrode, the method comprising: aerosolizing an electrode active material to produce an aerosolized electrode active material powder; contacting the aerosolized electrode active material powder with single-walled (or multi-walled) carbon nanotubes in a carrier gas to form a mixture of the carbon nanotubes and the aerosolized electrode active material powder; depositing the mixture on polymer particles (or other suitable form of polymer), which are attached on a conveyor belt or a roll-to-roll system; and removing the carrier gas and heating the mixture of CNT/electrode active material/polymer to the temperature close to the melting point of the polymer, which then forms a flexible solid body, to continuously form the CNT supported self-standing electrode material that is a composite of single-walled (or multi-walled) carbon nanotubes and the electrode active material embedded in the polymer based battery packaging materials. In place of or in addition to heating, treating the mixture by any means known in the art, to convert the polymer to a flexible solid body, can be provided to form CNT supported self-standing electrodes embedded in the polymer based battery packaging materials. The polymer particles, granules, or sheets can be a bed of polymer particles, granules, or sheets with a first and second side.

According to some aspects, a self-standing electrode is prepared by providing an aerosolized mixture of carbon nanotubes and electrode active materials, directing the aerosolized mixture to a collecting surface, depositing the mixture on the collecting surface, and subsequently depositing polymer particles, granules, polymer film or other suitable polymer form, upon the mixture. The mixture and the polymer particles or film are heated to the temperature close to the melting point of the polymer, which then forms a flexible solid body, to form carbon nanotube supported self-standing electrodes embedded in the polymer based battery packaging materials. In place of or in addition to heating, treating the mixture and polymer by any means known in the art, to convert the polymer to a flexible solid body, can be provided to form CNT supported self-standing electrodes embedded in the polymer based battery packaging materials.

In contrast to dispersion by ball milling, sonication, and other harsh methods, for example, the embodiments disclosed herein can provide nanotubes or nanofibers without inevitable reduction of aspect ratio, introduction of defects, surface contamination, or degradation of nanotube or nanofiber properties. According to some aspects, the lack of significant reduction of aspect ratio, introduction of defects, or degradation provides improved properties (e.g. conductivity, density, flexibility, self-standing) of electrodes or batteries. These aspects, in sum with the other embodiments disclosed herein, demonstrate that the steps within the presently disclosed methods can be performed in various orders with various configurations, and the formation of CNT supported self-standing electrodes embedded in the polymer based battery packaging can be achieved. According to some aspects, the methods disclosed herein can comprise steps.

According to some aspects, a method of making an embedded electrode is provided herein, the method comprising: providing a self-standing electrode comprising an active electrode material distributed throughout an overlaid and optionally interlinked or crosslinked nanotube network, the self-standing electrode includes a first side and a second side; applying a polymeric material to the first side of the self-standing electrode; and treating the polymeric material to form a solid body with a portion of the self-standing electrode embedded therein. The method can comprise polymeric material comprising polymeric particles, granules or any other form of polymer suitable in the art. The method can be, in some embodiments, wherein the step of applying the polymeric material to the first side of the self-standing electrode comprises: fluidizing the polymeric particles in a carrier gas; and directing the fluidized mixture of polymeric particles and carrier gas to the first side of the self-standing electrode, wherein the carrier gas flows through the self-standing electrode and the polymeric particles are deposited on the first side of the self-standing electrode. Optionally a polymer sheet, fabric, film, net, or composite can be deposited on the first side of the self-standing electrode instead of polymeric particles, with or without the carrier gas.

The present disclosure is not limited to utilization of gas-phase aerosols, suspensions, or dry dispersions. Any method of depositing or directing can be used. In some embodiments, the present disclosure can utilize a liquid dispersion method, in some non-limiting examples as described in U.S. patent application Ser. No. 16/287,621, to provide an aerosolized mixture of carbon nanotubes and electrode active materials. Further non-limiting examples of suspending, aerosolizing, depositing, or directing are known in the art such as electrostatic methods, sonic or vibration methods, fluid bed methods, gravity feed, or pressurized dry-spray methods. As used herein, the terms "aerosol" and "aerosolized" refer to a fluidized solid and comprise a suspension of a solid in a liquid or a suspension of a solid in a gas as needed but do not limit the present disclosure if, for example, an electrostatic method or gravity feed method of depositing or directing is utilized. Further, non-limiting examples of making self-standing electrodes are described in U.S. patent application Ser. No. 15/665,171. In some embodiments, the self-standing electrode can be pre-manufactured and overlaid or laminated with a suitable polymer film, sheet, fabric, blanket, net, or composite and subsequently treated to form CNT supported self-standing electrodes embedded in the polymer based battery packaging materials, or the pre-manufactured self-standing electrode can be overlaid on a suitable polymer followed by treating.

It is to be understood that as used herein, "heating" is non-limiting and can comprise treating the mixture of CNT/electrode active material/polymer by any method known in the art to form the CNT supported self-standing electrode material that is a composite of carbon nanotubes and the electrode active material embedded in the polymer based battery packaging materials. After heating or treating or a combination of both, the polymer forms a flexible solid body. Some non-limiting examples of treating are chemical treatment, electromagnetic waves (for example UV light), and waiting for a period of time. As used herein, the term "melt" comprises a polymer form transition to a polymer flexible solid body and does not necessitate heat. For example, a self-curing polymer that does not require heat to form a flexible solid body can be used in the present disclosure. The present disclosure is not limited by the type or form of polymer used. As used herein, the term "polymer particles" refers to polymer fibers, pellets, flakes, granules, beads, fabrics, sheets, or any polymer form suitable for the present disclosure; various forms of polymer as used herein may form a bed of particles, fibers, pellets, flakes, granules, beads, fabrics, sheets; the bed comprising a first side and a second side. As used herein, the term "solid body" refers to a flexible polymer.

As used herein, "electrode active material" refers to the conductive material in an electrode, which may be provided in a powder form. The term "electrode" refers to an electrical conductor where ions and electrons are exchanged with an electrolyte and an outer circuit. "Positive electrode" and "cathode" are used synonymously in the present description and refer to the electrode having the higher electrode potential in an electrochemical cell (i.e. higher than the negative electrode). "Negative electrode" and "anode" are used synonymously in the present description and refer to the electrode having the lower electrode potential in an electrochemical cell (i.e. lower than the positive electrode). Cathodic reduction refers to a gain of electron(s) of a chemical species, and anodic oxidation refers to the loss of electron(s) of a chemical species.

In a non-limiting example as shown in FIG. 1A, CNT supported self-standing electrodes for Li-ion batteries are prepared by providing an aerosolized mixture of carbon nanotubes and electrode active materials at step S100, and directing the aerosolized mixture to polymer particles supported by porous quartz frit at step S101. Subsequently, heating the aerosolized mixture and polymer particles to melt the polymer to form a composite self-standing electrode of a desired thickness. Optionally, the self-standing electrode can be treated at step S102 to, for example, increase the density of the self-standing electrode. The self-standing electrode is CNT supported, flexible, and can optionally be cut to the desired dimensions of a battery electrode. The self-standing electrode is optionally free of binder and optionally can be used without a metal-based current collector (typically alumina or copper depending on the electrode type). According to some aspects, the self-standing electrode can be used without a metal-based current collector and with a battery tab for various applications. Non-limiting examples of methods to embed battery tab attachments are described in U.S. patent application Ser. No. 16/123,872. Non-limiting examples of methods to attach battery tab attachments to a self-standing electrode are described in U.S. patent application Ser. No. 16/123,935. In some embodiments, the carbon nanotubes can perform the function of a metal-based current collector, eliminating the need for a metal-based current collector.

In another example as shown in FIG. 1B, CNT supported self-standing electrodes for Li-ion batteries are prepared by providing an aerosolized mixture of carbon nanotubes and electrode active materials at step S200, and subsequently depositing the aerosolized mixture to polymer particles or granules attached on a conveyor belt or a roll-to-roll system at step S201. Subsequently, the mixture of CNT/electrode active material/packaging polymer is heated to the temperature close to the melting point of the polymer to continuously produce a composite self-standing electrode of a desired thickness embedded in the polymer based battery packaging materials. Optionally, the self-standing electrode can be treated at step S202 to, for example, increase the density of the self-standing electrode. The self-standing electrode is CNT supported, flexible, and can optionally be cut to the desired dimensions of a battery electrode. The self-standing electrode is optionally free of binder and optionally can be used without a metal-based current collector (typically alumina or copper depending on the electrode type). In some embodiments, use without a metal-based current collector can comprise the use of a battery tab.

According to some aspects, the carbon nanotubes can perform the function of a metal-based current collector.

Figure 2:
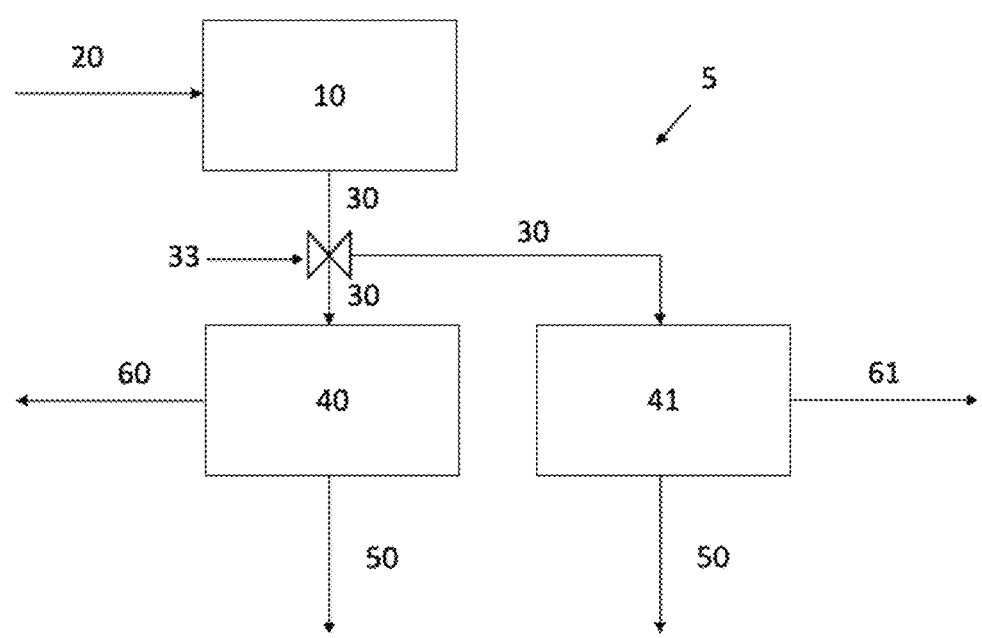
FIG. 2 is a flow diagram illustrating an exemplary apparatus for making a self-standing electrode according to an embodiment of the present disclosure.

The apparatus for providing the aerosolized mixture of carbon nanotubes and electrode active materials is not limited in any way. In an illustrative example as shown in FIG. 2, an apparatus 5 for the production of self-standing electrodes is provided. The carbon nanotubes and the electrode active materials are added to a vessel 10. The carbon nanotubes and the electrode active materials may be individually collected from their respective manufacturing processes and directly or indirectly introduced from such processes into the vessel 10 at a desired ratio for the self-standing electrodes. One or more carrier gases 20 may then be introduced to the vessel 10 to aerosolize the mixture of the nanotubes and electrode active materials. The resulting mixed aerosolized stream 30 comprising the nanotubes and the electrode active materials entrained in the carrier gas is directed to polymer particles supported by a porous substrate 40, such as a filter or porous quartz frit. The carrier gas passes through the porous substrate 40 as gas stream 50 while the mixture of the nanotubes and the electrode active material is captured on the surface of polymer particles, which are suitable for battery packaging. The mixture containing CNT/electrode active material/packaging polymer is heated to the temperature close to the melting point of the polymer to produce the CNT supported self-standing electrode embedded in the melted polymer 60. The self-standing electrode 60 can be removed from the porous substrate 40 when it reaches the desired thickness.

Optionally, the apparatus 5 may include a plurality of porous substrates 40, 41 to allow for the continuous production of CNT supported self-standing electrodes 60, 61 embedded in packaging polymer. Although only two porous substrates are shown, it is to be understood that any number of porous substrates may be included in the apparatus 5. In a non-limiting example, when the flow of the mixed aerosolized stream 30 across the porous substrate 40 produces the self-standing electrode 60 of the desired thickness, a valve 33 may be adjusted to transfer the flow of the mixed aerosolized stream 30 to a second porous substrate 41. The self-standing electrode 60 embedded in packaging polymer may be removed from the first porous substrate 40 during formation of the self-standing electrode 61 on the porous substrate 41. When the flow of the mixed aerosolized stream 30 across the second porous substrate 41 produces the self-standing electrode 61 of a desired thickness, the valve 33 may be adjusted to transfer the flow of the mixed aerosolized stream 30 back to the first porous substrate 40. The thickness and/or cross-sectional area of the self-standing electrode 61 may be the same, or different, than the cross-sectional area of the self-standing electrode 60. For example, the self-standing electrode 61 may have a greater thickness and/or cross-sectional area than the self-standing electrode 60.

It is to be understood that a variety of different methods may be used for automatically switching the valve 33 to redirect the flow of the mixed aerosolized stream 30 from one porous substrate to the other. Illustrative examples of systems that may be used to adjust the valve 33 to redirect the flow of the mixed aerosolized stream 30 include one or more sensors for detecting the thickness of the self-standing electrodes 60 and 61, one or more pressure sensors for monitoring a pressure drop across the porous substrates 40 and 41 that corresponds to a desired thickness of the self-standing electrodes 60 and 61, a timer that switches the valve 33 after a set time corresponding to a desired thickness of the self-standing electrodes 60 and 61 for a given flow rate of the mixed aerosolized stream 30, and any combination thereof; after the one or more pressure sensors measures a pressure drop associated with the desired thickness of the self-standing electrode 60 or 61 on porous substrate 40 or 41, or after the one or more thickness sensors detect the desired thickness of the self-standing electrode 60 or 61 on porous substrate 40 or 41, or after the timer measures the set time corresponding to the desired thickness of self-standing electrode 60 or 61 on porous substrate 40 or 41, the mixture is redirected from one porous substrate to the other. It is also to be understood that the porous substrates 40 and/or 41 may have a cross-sectional area that matches the desired cross-sectional area required for use in the battery cell to be made with the self-standing electrode 60 and/or 61. Accordingly, the self-standing electrodes 60 and/or 61 would require no further processing of the cross-sectional area, such as cutting, before assembly in the final battery cell. Notably, the porous substrates 40 and 41 are covered with battery packaging polymer particles and, after heating treatment, the resulting self-standing electrodes 60 and 61 are embedded in the packaging polymers.

Figure 3:
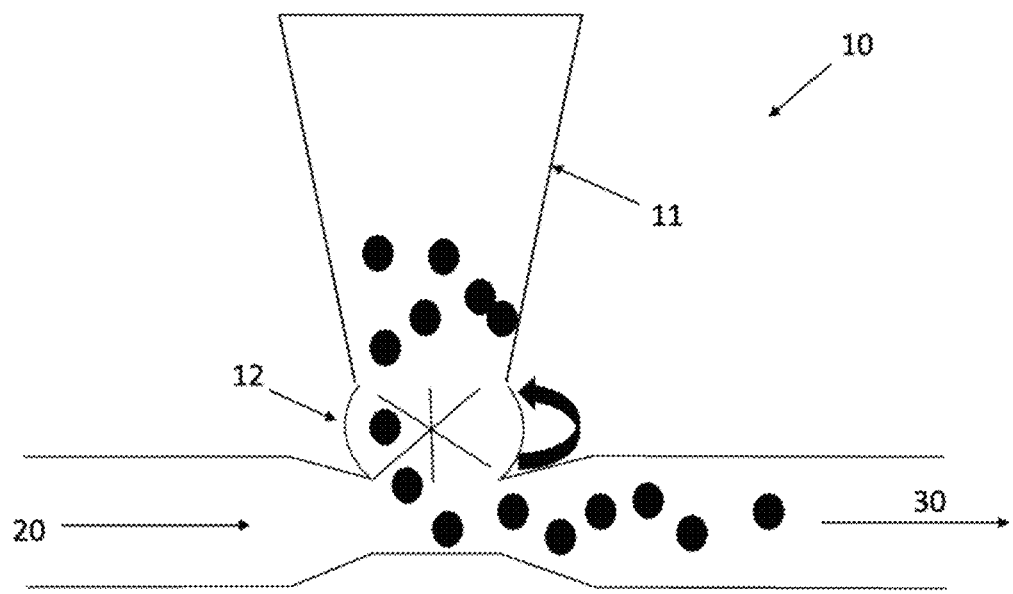
FIG. 3 is a schematic view illustrating a vessel according to an embodiment of the present disclosure.

It is to be understood that the configuration of the vessel 10 is not intended to be limited in any way. In an illustrative example as shown in FIG. 3, the vessel 10 may be a pneumatic powder feeder, such as a venturi feeder that includes a hopper 11 for receiving the nanotubes and the electrode active material therein. The vessel 10 may also include a rotary valve 12 that feeds the nanotubes and the electrode active material into contact with the carrier gas 20 that is introduced to the vessel 10 to form the mixed aerosolized stream 30.

Figure 4:
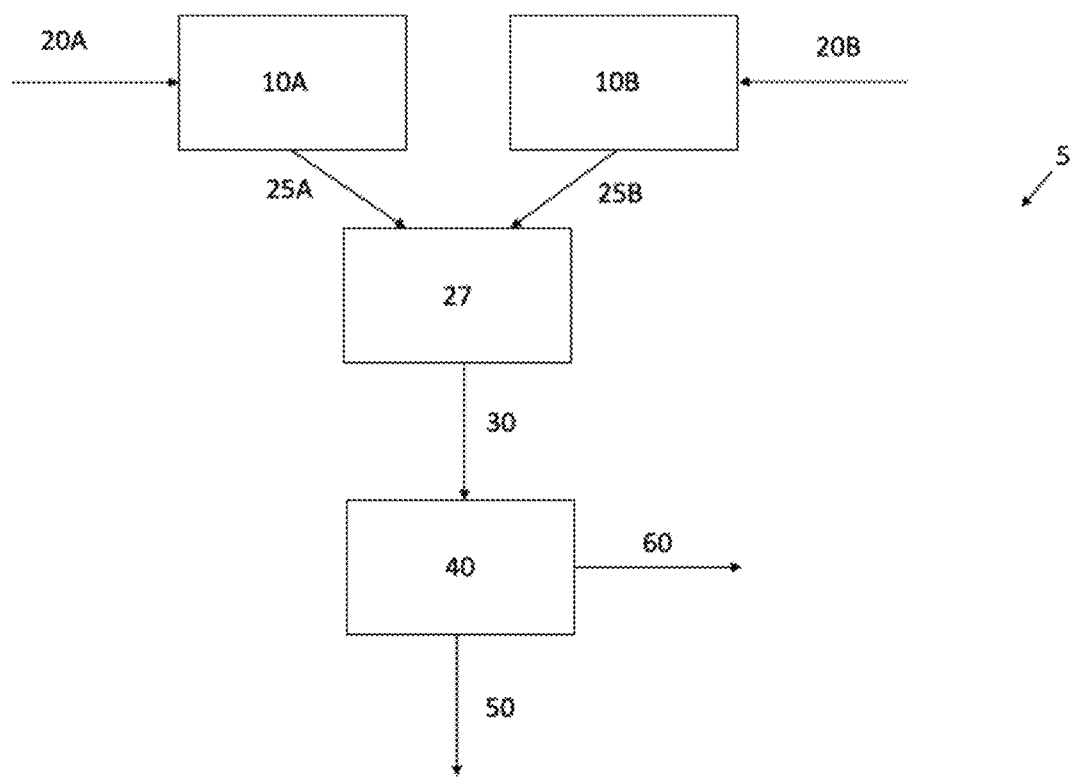
FIG. 4 is a flow diagram illustrating an exemplary apparatus for making a self-standing electrode according to an embodiment of the present disclosure.

As shown in FIG. 4, the nanotubes and the electrode active material may be individually aerosolized before mixing. For example, the nanotubes may be provided in the vessel 10A and the electrode active material may be provided in the vessel 10B. One or more carrier gases 20A may be introduced to the vessel 10A to aerosolize the nanotubes, and one or more carrier gases 20B may be introduced to the vessel 10B to aerosolize the electrode active materials. An aerosolized stream 25A comprises the nanotubes entrained in the carrier gas 20A introduced to the vessel 10A, and an aerosolized stream 25B comprises the electrode active materials entrained in the carrier gas 20B introduced to the vessel 10B. The aerosolized stream 25A is mixed with the aerosolized stream 25B at junction/mixer 27. The junction/mixer 27 may have any configuration capable of combining the aerosolized stream 25A and the aerosolized stream 25B into the mixed aerosolized stream 30 that comprises a mixture of the nanotubes and the electrode active materials entrained in the carrier gases. The mixed aerosolized stream 30 is directed to the porous substrate 40, which is covered by the packaging polymer particles. The carrier gas passes through the porous substrate 40 as gas stream 50 while the mixture of the nanotubes and the electrode active material is captured on the surface of the polymer particles. The mixture of CNT/electrode active material/packaging polymer supported by porous substrate 40 is heated to the temperature close to the melting point of the polymer to produce the self-standing electrodes 60 embedded in the melt polymer. The self-standing electrode 60 along with the embedded polymer can be removed from the porous substrate 40 when it reaches the desired thickness. The carrier gases 20A and 20B may be the same, or different, and may be introduced at the same or different flow rates. For example, the flow rates of the carrier gases 20A and 20B may be tailored to feed the nanotubes and the electrode active material to the junction/mixer 27 at the individual flow rates necessary to achieve the desired ratio of nanotubes to electrode active material in the resulting self-standing electrode 60. Although not shown, it is to be understood that more than one porous substrate 40 may be provided as described with respect to FIG. 2.

Figure 5:
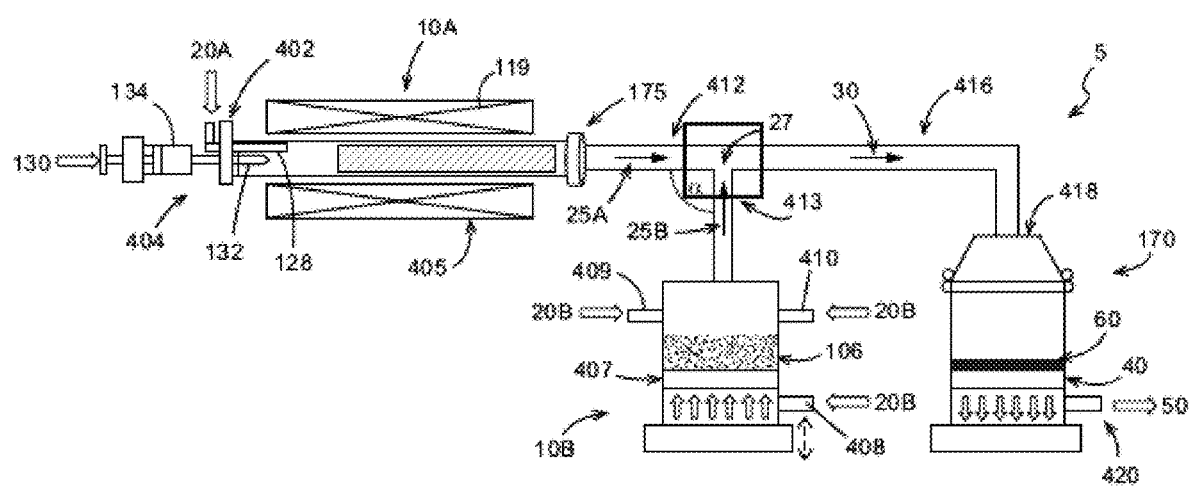
FIG. 5 is a schematic view of an apparatus according to an embodiment of the present disclosure.

As shown in FIG. 5, the nanotubes may be provided in an aerosolized stream 25A directly from the vessel 10A that is configured as a nanotube synthesis reactor for mixing with an aerosolized stream 25B of the electrode active material from the source 106. Accordingly, the aerosolized stream 25A may be a product stream exiting the nanotube synthesis reactor. For example, a carbon source or carbon precursor 130 may be introduced to the vessel 10A in the presence of one or more carrier gases 20A to form carbon nanotubes. The aerosolized stream 25A of carbon nanotubes exits the reactor outlet 175 and travels down a pipe or tube 412 to a junction 27 where the aerosolized carbon nanotubes are mixed with the aerosolized stream 25B of the electrode active materials. Although the pipes forming the junction 27 intersect at a 90 degree angle of intersection 'a', other angles of intersection a may be formed. In a non-limiting example, the angle of intersection a may be an acute angle that facilitates flow of the resulting mixed aerosolized stream 30 from the junction/mixer 27 to polymer particles supported by the porous substrate 40. Although not shown, it is to be understood that more than one porous substrate 40 (and collection vessel 170) may be provided as described with respect to FIG. 2.

As an alternative to the specific apparatus noted above where the electrode active material is mixed with the nanotubes after the nanotubes are formed, the electrode active material can be mixed in situ in a fluidized bed reactor or chamber with the nanotubes as the nanotubes are formed.

Carrier and fluidizing gases suitable for use with the present disclosure include, but are not limited to, argon, hydrogen, nitrogen, and combinations thereof. Carrier gases may be used at any suitable pressure and at any suitable flow rate to aerosolize the nanotubes and the electrode active materials and transport the aerosolized mixture of the nanotubes and the electrode active materials to the porous substrate at a sufficient velocity to form the self-standing electrode on the surface thereof. In some embodiments, the carrier gas may be argon, hydrogen, helium, or mixtures thereof. In some embodiments, the carrier gas may comprise argon at a flow rate of 850 standard cubic centimeters per minute (sccm) and hydrogen at a flow rate of 300 sccm.

The polymer particles used in the present disclosure are not limited and, for example, can comprise polymer fibers, pellets, beads, particles, flakes, woven or non-woven polymer fabric, sheets, nets, blankets, or any shape (form) of polymer suitable to form CNT supported self-standing electrodes embedded in the polymer based battery packaging materials. As used herein according to some aspects, the term "form" is not the type or chemical composition of polymer. Various types and chemical compositions of polymers are known in the art. The type of nanotubes used in the present disclosure are not limited. As used herein, the terms "nanotubes" and "carbon nanotubes" (CNT) are used interchangeably and can comprise single-wall or multi-wall nanotubes or nanofibers. The nanotubes may be entirely carbon, or they made be substituted, that is, have non-carbon lattice atoms. Carbon nanotubes may be externally derivatized to include one or more functional moieties at a side and/or an end location. In some aspects, carbon and inorganic nanotubes include additional components such as metals or metalloids, incorporated into the structure of the nanotube. In certain aspects, the additional components are a dopant, a surface coating, or are a combination thereof.

According to some aspects, the nanotubes utilized in the present disclosure may be metallic, semimetallic, or semiconducting depending on their chirality. A carbon nanotube's chirality is indicated by the double index (n,m), where n and m are integers that describe the cut and wrapping of hexagonal graphite when formed into a tubular structure, as is well known in the art. A nanotube of an (m,n) configuration is insulating. A nanotube of an (n,n), or "arm-chair", configuration is metallic, and hence highly valued for its electric and thermal conductivity. Carbon nanotubes may have diameters ranging from about 0.6 nm for single-wall carbon nanotubes up to 500 nm or greater for single-wall or multi-wall nanotubes. The nanotubes may range in length from about 50 nm to about 10 cm or greater. In some embodiments, the nanotubes can perform the function of a current collector or a metal-based current collector (typically alumina or copper depending on the electrode type).

In a non-limiting example, the carbon nanotubes may be synthesized in a reactor or furnace from a carbon source in the presence of a catalyst, at a temperature of about 1000 to about 1500° C., such as about 1300° C. After synthesis of carbon nanotubes or nanofibers, according to some aspects, the methods disclosed herein do not significantly degrade the aspect ratio or properties of the nanotubes or nanofibers. As used herein, the term "significantly degrade" means fragment, reduce the size or length of, bundling, introduce defects or contamination, or other terms known in the art. For example, methods such as ball milling or sonication of carbon nanotubes or nanofibers significantly degrade the nanotubes or nanofibers. Carbon nanotubes describes herein can comprise nanofibers.

The present disclosure is not limited to the type or form of catalysts used for the production of carbon nanotubes. In various aspects, the catalyst particles are present as an aerosol. In some aspects, the catalyst materials are supplied as nanoparticles, comprising a transition metal, a lanthanide metal, or an actinide metal. For example, the catalyst may comprise a Group VI transition metal such as chromium (Cr), molybdenum (Mo), and tungsten (W), or a Group VIII transition metal such as iron (Fe), cobalt (Co), nickel (Ni), ruthenium (Ru), rhodium (Rh), palladium (Pd), osmium (Os), Iridium (Ir), and platinum (Pt). In some aspects, a combination of two or more metals are used, for example an iron, nickel, and cobalt mixture or more specifically a 50:50 mixture (by weight) of nickel and cobalt. The catalyst may comprise a pure metal, a metal oxide, a metal carbide, a nitrate salt of a metal, and/or other compounds containing one or more of the metals described herein. The catalyst may be added to the reactor at about 0.1 atom % to about 10 atom %, where atom % indicates the percentage of the number of catalyst atoms with respect to the total number of atoms in the reactor (catalyst and carbon precursor atoms).

Alternatively or in combination, a catalyst precursor may be introduced, wherein the catalyst precursor can be converted to an active catalyst under the reactor's conditions. The catalyst precursor may comprise one or more transition metal salts such as a transition metal nitrate, a transition metal acetate, a transition metal citrate, a transition metal chloride, a transition metal fluoride, a transition metal bromide, a transition metal iodide, or hydrates thereof. For example, the catalyst precursor may be a metallocene, a metal acetylacetonate, a metal phthalocyanine, a metal porphyrin, a metal salt, a metalorganic compound, or a combination thereof. For example, the catalyst precursor may be a ferrocene, nickelocene, cobaltocene, molybdenocene, ruthenocene, iron acetyl acetonate, nickel acetylacetonate, cobalt acetylacetonate, molybdenum acetylacetonate, ruthenium acetylacetonate, iron phthalocyanine, nickel phthalocyanine, cobalt phthalocyanine, iron porphyrin, nickel porphyrin, cobalt porphyrin, an iron salt, a nickel salt, cobalt salt, molybdenum salt, ruthenium salt, or a combination thereof. The catalyst precursor may comprise a soluble salt such as $Fe(NO_3)_3$, $Ni(NO_3)_2$ or $Co(NO_3)_2$ dissolved in a liquid such as water. The catalyst precursor may achieve an intermediate catalyst state in the catalyst particle growth zone of the reactor, and subsequently become converted to an active catalyst upon exposure to the nanostructure growth conditions in the nanostructure growth zone of the reactor. For example, the catalyst precursor may be a transition metal salt that is converted into a transition metal oxide in the catalyst particle growth zone, then converted into active catalytic nanoparticles in the nanostructure growth zone.

The catalyst particles may comprise a transition metal, such as a d-block transition metal, an f-block transition metal, or a combination thereof. For example, the catalyst particles may comprise a d-block transition metal such as an iron, nickel, cobalt, gold, silver, or a combination thereof. The catalyst particles may be supported on a catalyst support. In order to have catalyst particles on a catalyst support, the catalyst support material may be introduced into the catalyst material prior to adding the catalyst to the reactor.

The present disclosure is not limited to the type of carbon precursors or carbon sources used to form carbon nanotubes such as one or more carbon-containing gases, one or more hydrocarbon solvents, and mixtures thereof. Examples of carbon precursors include, but are not limited to hydrocarbon gases, such as methane, acetylene, and ethylene; alcohols, such as ethanol and methanol; benzene; toluene; CO; and $CO_2$. A fuel for carbon nanotube synthesis and growth comprises a mixture of one or more carbon precursors or carbon sources and one or more catalysts or catalyst precursors.

The fuel or precursor may be injected at a range of about 0.05 to about 1 ml/min, such as about 0.1 ml/min or about 0.3 ml/min, per injector. In some embodiments, more than one injector may be used, for example at large scale. The gas flow rate may be about 0.1 to about 5 L/min of hydrogen and/or about 0.2 to about 2 L/min helium or argon, such as about 5 L/min hydrogen, or 0.3 L/min hydrogen and about 1 L/min argon. Without wishing to be bound to any particular theory, helium or argon may be included in the carrier gas to dilute the hydrogen concentration, for example to keep the hydrogen concentration below the explosive limit. Selection of a fuel injection rate and/or a gas flow rate may depend, for example, on the reactor volume, as will be apparent to those of ordinary skill in the art. In some embodiments, more than one reactor may be used in conjunction. In some embodiments, the reactor temperature profile consists of a starting low temperature, an increase to a peak or a maximum, and then a decrease, preferably to the starting low temperature. Without wishing to be bound by any particular theory, for a given reactor temperature profile, the injector position inside the reactor should be correlated with the precursor temperature so that the precursor evaporates from the point of injection, without droplet formation or decomposition, as can be determined by those of ordinary skill in the art, considering for example the boiling point and decomposition. In some embodiments, the injector tip may be inserted into the reactor, for example, by about 8 inches. The injection temperature, at the tip of the injector, may depend on the reactor or furnace temperature and upon the depth of insertion of the injector into the reactor or furnace. In some embodiments, the injection temperature at the tip of the injector is about 750° C. In some embodiments, the injector tip is inserted about 8 inches inside the reactor. The carbon nanotube reactor may be run for any suitable length of time to obtain the product composition and thickness desired, as can be determined by those of ordinary skill in the art, for example as long as there are starting materials.

Collecting the mixture of carbon nanotubes and aerosolized electrode active material powder on a surface and removing the carrier gas may be carried out by any suitable means. The collecting surface of the porous substrate 40, 41 may be a porous surface. The porous substrate used in the present disclosure is not limited and, for example, can be a porous metal, a porous polymer, a filter, or a frit, where the pores are appropriately sized to retain the mixture of carbon nanotubes and the electrode active material thereon to form the self-standing electrode while permitting passage of the carrier and fluidizing gases. In some embodiments, for example wherein the aerosolized mixture of carbon nanotubes and electrode active materials is directed to a collecting surface, the collecting surface can be non-porous. In some embodiments, the polymer particles can comprise a woven or non-woven porous sheet, net, or blanket where the pores are appropriately sized to retain the mixture of carbon nanotubes and the electrode active material. In some embodiments, the porous polymer sheet or porous blanket polymer can be used without another porous substrate, wherein the porous polymer sheet, net, or porous blanket retains the mixture of carbon nanotubes and the electrode active material. Thus, according to some aspects, the mixture of carbon nanotubes and aerosolized electrode active material powder can be collected on a non-woven or woven porous sheet, net, or blanket of a polymer. The carrier and fluidizing gases may be removed after passing through the surface and by way of an outlet. In some embodiments, removal of the carrier gas may be facilitated by a vacuum source. With respect to filters, the filters may be in the form of a sheet and may comprise a variety of different materials including woven and non-woven fabrics. Illustrative filter materials include, but are not limited to, cotton, polyolefins, nylons, acrylics, polyesters, fiberglass, and polytetrafluoroethylene (PTFE). In some embodiments, the filter materials can be a polymer suitable to form CNT supported self-standing electrodes embedded in the polymer based battery packaging materials. To the extent the porous substrate is sensitive to high temperatures, one or more of the streams 25A, 25B, and 30 may be precooled with dilution gases comprising a lower temperature and/or by directing one or more of the streams 25A, 25B and 30 through a heat exchanger prior to contacting the porous substrate.

In some embodiments, the aerosolizing of the electrode active material comprises distributing an aerosolizing gas through a first porous frit and a bed of an electrode active material, in an aerosolizing chamber, to produce the aerosolized electrode active material powder. The aerosolizing chamber may be constructed with an appropriately sized porous material such that gas can pass through to enable aerosolization but that does not permit the active material to fall through the pores. The aerosolizing chamber is not limited to any particular configuration. Suitable aerosolizing gases include, but are not limited to, argon, helium, or nitrogen. In some embodiments, the aerosolizing gas may be the same as the carrier gas. The aerosol can comprise a suspension. In some embodiments disclosed herein, the aerosol can be a suspension of a solid in a gas, a solid in a liquid, or various combinations thereof.

In some embodiments, the electrode active material is selected from graphite, hard carbon, metal oxides, lithium metal oxides, and lithium iron phosphate. In some embodiments, the electrode active material for the anode may be graphite or hard carbon. In some embodiments, the electrode active material for the cathode may be lithium metal oxides or lithium iron phosphate.

In a non-limiting example, the electrode active material may be any solid, metal oxide powder that is capable of being aerosolized. In an illustrative example, the metal oxide is a material for use in the cathode of the battery. Non-limiting examples of metal oxides include oxides of Ni, Mn, Co, Al, Mg, Ti and any mixture thereof. The metal oxide may be lithiated. In an illustrative example, the metal oxide is lithium nickel manganese cobalt oxide ($LiNiMnCoO_2$). The metal oxide powders can have a particle size defined within a range between about 1 nanometer and about 100 microns. In a non-limiting example, the metal oxide particles have an average particle size of about 1 nanometer to about 10 nanometers.

Metals in lithium metal oxides according to the present disclosure may include but are not limited to one or more alkali metals, alkaline earth metals, transition metals, aluminum, or post-transition metals, and hydrates thereof. In some embodiments, the electrode active material is lithium nickel manganese cobalt oxide ($LiNiMnCoO_2$).

"Alkali metals" are metals in Group I of the periodic table of the elements, such as lithium, sodium, potassium, rubidium, cesium, or francium.

"Alkaline earth metals" are metals in Group II of the periodic table of the elements, such as beryllium, magnesium, calcium, strontium, barium, or radium.

"Transition metals" are metals in the d-block of the periodic table of the elements, including the lanthanide and actinide series. Transition metals include, but are not limited to, scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, actinium, thorium, protactinium, uranium, neptunium, plutonium, americium, curium, berkelium, californium, einsteinium, fermium, mendelevium, nobelium, and lawrencium.

"Post-transition metals" include, but are not limited to, gallium, indium, tin, thallium, lead, bismuth, or polonium.

In some embodiments, the method further comprises allowing the mixture of carbon nanotubes and electrode active material in the carrier gas to flow through one or more tubes connecting the aerosolizing reactor, the carbon nanotube synthesis reactor, and the collection chamber. In some embodiments, the one or more tubes are at least about 0.5" O.D. stainless tubing.

The loading or weight % of carbon nanotubes in the composite self-standing electrode product is based on the relative amounts of the nanotubes (or carbon source used to form the nanotubes) and the electrode active material. It is within the level of ordinary skill in the art to determine the relative starting amounts of carbon source, catalyst/catalyst precursor, and electrode active material that will afford a given loading or weight % of carbon nanotubes in the composite self-standing electrode product. In a non-limiting example, the self-standing electrode may comprise from 0.1% to 4% by weight carbon nanotubes, and the balance the electrode active material and optionally one or more additives. Optionally, the self-standing electrode may comprise from 0.2% to 3% by weight carbon nanotubes, and the balance the electrode active material and optionally one or more additives. Optionally, the self-standing electrode may comprise from 0.75% to 2% by weight carbon nanotubes, and the balance the electrode active material and optionally one or more additives. Additives and/or dopants may be present for each range in an amount of 0 to 5% by weight. In a non-limiting example, the self-standing electrode consists essentially of the carbon nanotubes and the electrode active material powder. In a non-limiting example, the self-standing electrode consists of the carbon nanotubes and the electrode active material powder. For each of the ranges, the self-standing electrode may be free of any binders. The lack of a binder results in a self-standing electrode with improved flexibility. Further, it has been discovered that a higher carbon nanotube content increases the flexibility of the self-standing electrode. Without being bound to any particular theory, this is likely due to the webbed morphology of the self-standing electrode in which there is a webbed arrangement of carbon nanotubes with the electrode active material contained or embedded within the web.

In a non-limiting example, the self-standing electrode may comprise a density of 0.9 to 1.75 g/cc. Optionally, the self-standing electrode may comprise a density of 0.95 to 1.25 g/cc. Optionally, the self-standing electrode may comprise a density of 0.75 to 2.0 g/cc. Optionally, the self-standing electrode may comprise a density of 0.95 to 1.60 g/cc.

In a non-limiting example, the self-standing electrode may comprise a thickness of up to 750 μm following collection on the porous substrate. Optionally, the self-standing electrode may comprise a thickness of 50 μm to 500 μm following collection on the porous substrate. Optionally, the self-standing electrode may comprise a thickness of from 100 μm to 450 μm following collection on the porous substrate. Optionally, the self-standing electrode may comprise a thickness of from 175 μm to 250 μm following collection on the porous substrate.

In some embodiments, the method of the present disclosure may further comprise treating the composite or self-standing electrode, including but not limited to pressing the composite or self-standing electrode. Without wishing to be bound to any particular theory, pressing may increase the density and/or lower the thickness of the self-standing electrode, which may improve such properties as rate performance, energy density, and battery life. Pressing of the self-standing electrodes may be carried out by applying a force to achieve a desired thickness and/or density, such as by using a rolling press or calendaring machine, platen press, or other suitable means, as will be known to those of ordinary skill in the art. Any suitable force may be applied, to achieve a desired thickness, and/or density, and/or impedance, such as but not limited to a force of about 1 ton, about 2 tons, about 3 tons, about 4 tons, about 5 tons, about 6 tons, about 7 tons, about 8 tons, about 9 tons, about 10 tons, about 15 tons, or any integer or range in between, such as between about 7 tons and about 10 tons. In some embodiments, pressing may be limited to pressing to a thickness of about 20 microns, about 30 microns, about 40 microns, about 50 microns, about 60 microns, about 70 microns, about 80 microns, about 90 microns, about 100 microns, about 150 microns, about 200 microns, about 250 microns, about 300 microns, about 350 microns, about 400 microns, or any integer or range in between. Without wishing to be bound by any particular theory, too thick of an electrode may be slow to produce energy or may not be suitably flexible. In some embodiments, it may be desirable to obtain an electrode foil that is flexible without formation of oxide or cracks. If the electrode is too thin, energy production may be rapid but it may be the case that not enough energy is produced. In addition, it may be desirable to regulate the distance between the rolls or rollers in a rolling press or calendaring machine, or between the plates of a platen press, by any suitable means known to those of ordinary skill in the art.

Determination of a suitable amount of pressing is within the level of ordinary skill in the art. As will be known to those of ordinary skill in the art, excessive pressing may cause the electrolyte to penetrate the electrode too much, as determined by measuring impedance and/or resistance to diffusion. As will be evident to those of ordinary skill in the art, it may be of interest to minimize the electrolyte diffusion resistance or coefficient for a given electrolyte, as measured by impedance. In a non-limiting example, the thickness of the self-standing electrode following pressing may be from 40% to 75% of the thickness of the untreated self-standing electrode, or the self-standing electrode following collection on the porous substrate. Optionally, the thickness of the self-standing electrode following pressing may be from 45% to 60% of the thickness of the untreated self-standing electrode, or the self-standing electrode following collection on the porous substrate.

In a non-limiting example, the density of the self-standing electrode following pressing is increased by 40% to 125% of the density of the untreated self-standing electrode, or the self-standing electrode following collection on the porous substrate. Optionally, the density of the self-standing electrode following pressing is increased by 45% to 90% of the density of the untreated self-standing electrode, or the self-standing electrode following collection on the porous substrate.

In some embodiments, the present disclosure is directed to an apparatus for producing a self-standing electrode, comprising: a single-walled carbon nanotube synthesis reactor which produces single-walled carbon nanotubes; an aerosolizing reactor configured to aerosolize an electrode active material into an aerosolized electrode active material powder and connected to the carbon nanotube synthesis reactor such that the aerosolized electrode active material powder is contacted with the single-walled carbon nanotubes in a carrier gas to form a mixture of the single-walled carbon nanotubes and the aerosolized electrode active material powder; and a collection chamber having a surface configured to collect the mixture and remove the carrier gas so as to form the self-standing electrode material that is a composite of the single-walled carbon nanotubes and the electrode active material. In place of or in combination with single-walled carbon nanotubes, multi-walled carbon nanotubes or carbon nanofibers can be produced. All embodiments described for the method apply with equal force to the apparatus.

The surface may be configured to collect the mixture and remove the carrier gas by any suitable means. The collecting surface may be a porous surface, including but not limited to a filter or a frit, where the pores are appropriately sized to permit passage of the carrier gas but not the mixture of carbon nanotubes and electrode active material. The carrier gas may be removed after passing through the surface and by way of an outlet. In some embodiments, removal of the carrier gas may be facilitated by a vacuum source.

In some embodiments, the aerosolizing reactor comprises a vertical shaker, one or more gas inlets, one or more outlets, and a first porous frit. In some embodiments, the aerosolizing reactor is downstream of the carbon nanotube synthesis reactor and upstream of the collection chamber. In some embodiments, the aerosolizing reactor is upstream of the carbon nanotube synthesis reactor and upstream of the collection chamber. In some embodiments, the aerosolizing reactor is coincident with the carbon nanotube synthesis reactor and upstream of the collection chamber.

In some embodiments, the present disclosure is directed to a self-standing electrode, comprising a composite of an electrode active material and single-walled carbon nanotubes; wherein the self-standing electrode does not contain binder material or a metal-based current collector material.

In some embodiments, the self-standing electrode comprises a webbed morphology or a net. In some embodiments, a webbed morphology or a net is a webbed arrangement of a plurality of nanotubes with the electrode active material contained or embedded within the nanotube web or net. The self-standing electrode is supported by the webbed arrangement of nanotubes. The use of binder or a metal-based current collector is optional. In some embodiments, the webbed arrangement of nanotubes can be a network of nanotubes or nanofibers, for example, an interlinked network, a cross-linked network, an overlaid network, a three-dimension network, a partially woven or interlocked network, or various combinations thereof. According to some aspects, each nanotube in the plurality of nanotubes is in contact with one or more other nanotubes in the plurality of nanotubes. In some embodiments, each point of contact can comprise a chemical bond, a point of charge transfer, a cross-link, or combinations thereof.

According to some aspects, a method of making an embedded electrode is provided herein, the method comprising: providing a polymeric body that extends from a first side to a second side; depositing a mixture of nanotubes or nanofibers and an active electrode material on the first side of the polymeric body to form a self-standing electrode, wherein at least a portion of the self-standing electrode is embedded in or penetrates the first side of the polymeric body and is embedded therein. Optionally, the polymeric body comprises a porous structure. For example, the polymeric body can comprise one or more layers of a polymer mesh, polymeric fibers, polymer fabrics, polymer blankets, polymer sheets, and polymer nets. In some embodiments, the method comprises fluidizing the mixture of nanotubes or nanofibers and the active electrode material with a gas or gas mixture, wherein the gas flows through the polymeric body when the mixture of nanotubes or nanofibers and the active electrode material is deposited on the first side of the polymeric body to form the self-standing electrode. Optionally, one or more layers, sheets, or applications of polymeric material can be applied or secured to the second side of the polymeric body after forming the self-standing electrode on the first side of the polymeric body.

According to some aspects, an embedded electrode is provided herein, the embedded electrode comprising: a polymeric body that includes a first side and a second side; and a self-standing electrode comprising an active electrode material distributed throughout an interlinked nanotube network, the self-standing electrode is positioned on the first side of the body, and a portion of the self-standing electrode is embedded in the polymeric body.

According to some aspects, a battery is provided herein, the battery comprising an anode, which comprises a first polymeric body that includes a first side and a second side; and a first self-standing electrode comprising an active electrode material distributed throughout an interlinked carbon nanotube network, the first self-standing electrode is positioned on the first side of the first polymeric body, and a portion of the first self-standing electrode is embedded in the first polymeric body. The battery further comprising a cathode, which comprises a second polymeric body that includes a first side and a second side; and a second self-standing electrode comprising an active electrode material distributed throughout an interlinked nanotube network; the second self-standing electrode is positioned on the first side of the second polymeric body, and a portion of the second self-standing electrode is embedded in the second polymeric body.

In some embodiments, a flexible battery is disclosed herein, the battery comprising one or more embedded electrodes disclosed herein; the embedded electrodes not requiring binder or metal-based current collector; the embedded electrodes providing enhanced energy density and therein providing enhanced energy density to the flexible battery; the battery providing a flexible and wearable power source for various devices. The methods and embedded electrode provided herein can, in various configurations, provide a thin, flexible battery with high energy density, yet the methods and embedded electrode are not limited by examples of the various embodiments described herein. The batteries disclosed herein can be a single electrochemical cell or comprise multi-electrochemical cells wherein the polymer based battery packaging materials separate multiple cells or are utilized as an external packaging. The batteries disclosed herein can be twistable, stretchable, flexible, thin, rollable, bendable, and foldable, and configured to cover micro- and large areas, while taking various shapes for thin, flexible batteries with high energy density applied to wearable devices, cosmetics, wearable medical sensors, drug delivery devices, portable electronics, smart packaging, and RFID, among other applications. The self-standing electrodes embedded in the polymer based battery packaging materials enable batteries of various thicknesses, shapes, flexibilities, conformations, and power densities.

In one embodiment, a method of manufacturing self-standing electrodes for Li-ion batteries includes the following steps: (1) synthesizing carbon nanotubes using thermal decomposition of metal catalyst precursor in a tube-like reactor using hydrocarbon (or COx) as carbon source, thiophene and $H_2$ as a nanotube growth promoter, and Ar and/or helium as a carrier gas; (2) in situ mixing of floating carbon nanotubes with aerosolized battery electrode active material (e.g. $LiNiMnCoO_2$ or graphite flakes); (3) deposition of the mixed aerosolized powder on the porous frit that consists of particles of the polymer material suitable for battery packaging; (4) heating the deposited powder film and the polymer frit at the temperature near the polymer melting temperature; and optionally (5) pressing, casting, cutting and tab attachment to the resulting electrodes conclude the electrode preparation (FIGS. 6A, 6B, 7A, 7B, and 8). Continuous production of self-standing electrodes can be achieved using a roll-to-roll system or a simple conveyor belt. The resulting electrodes for Li-ion battery are embedded in the polymer based packaging film and are free of metal current collector (FIG. 7A and FIG. 7B).

Figure 6A:
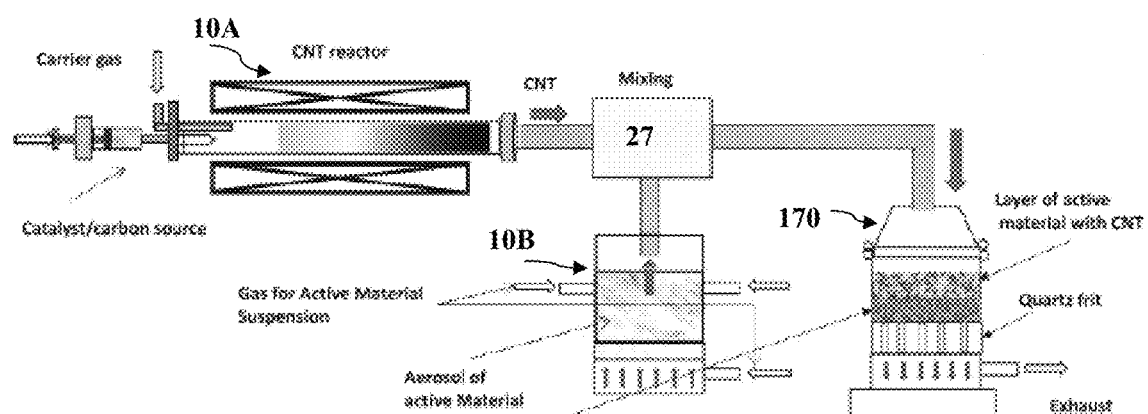
FIG. 6A is a schematic view of an apparatus of making CNT supported self-standing electrodes embedded in the polymer based packaging materials according to an embodiment of the present disclosure.
Figure 6B:
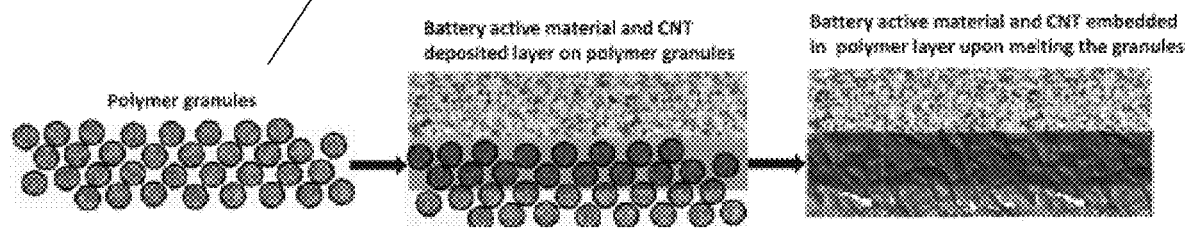
FIG. 6B is an inset view of aerosolized CNT and electrode active materials deposited on the polymer granules or particles in FIG. 6A and heating process for making the electrodes.
Figure 7A:
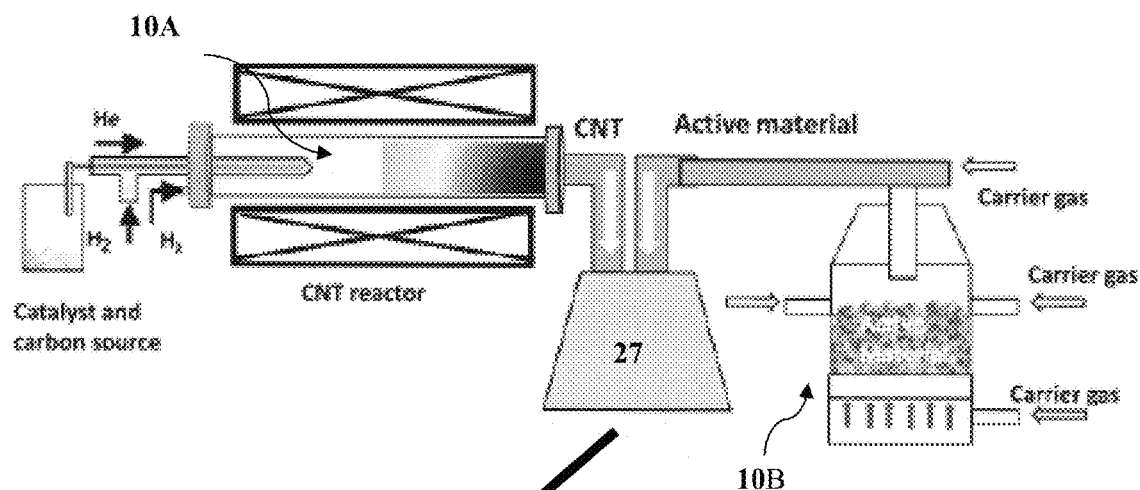
FIG. 7A is a schematic view of an apparatus of continuously making CNT supported self-standing electrodes embedded in the polymer based packaging materials according to an embodiment of the present disclosure.
Figure 7B:
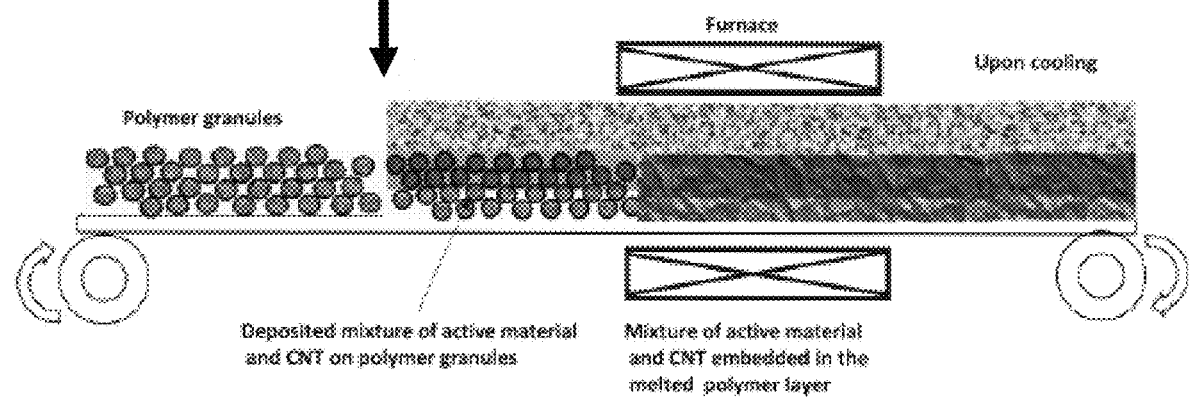
FIG. 7B is an inset view of aerosolized CNT and electrode active materials deposited on the polymer granules or particles in FIG. 7A and heating process for making the electrodes.

In an illustrative example as shown in FIGS. 5 and 6A, battery electrode active material, e.g. $LiNiMnCoO_2$ or graphite flakes, is aerosolized in reactor 10B. One or more carrier gases 20B are provided into reactor 10B to transport the aerosolized electrode active material into mixer 27. The floating carbon nanotubes produced in the synthesis reactor 10A using thermal decomposition of metal catalyst precursor is also introduced into the mixer 27. In the mixer 27, both aerosolized CNT and aerosolized electrode active material are blended. The blended mixture containing CNT and aerosolized electrode active material is introduced into reactor 170 by the carrier gases. In the reactor 170, the blended mixture is deposited on the surface of a layer of polymer particles, which are supported by a layer of porous quartz frit. The polymers are suitable for making battery packaging materials. Once the deposition process is finished, the deposited CNT and aerosolized electrode active material and polymer particles are heated at the temperature near the polymer melting point to form CNT supported, self-standing electrode composites, which are embedded in or intertwined with the packaging polymer materials. The heating process is illustrated in FIG. 6B. The CNT supported self-standing electrode composite may take the form of single uniform layer having CNT/electrode active material embedded in the polymer or the form of multiple layers, e.g. a sandwich structure having a polymer layer, a layer of CNT/electrode active material embedded in the polymer, and a layer of CNT/electrode active material without polymer. (See FIG. 6B). The electrode composite material can be further treated, for example, by pressing and casting, to increase the density of the self-standing electrode. The self-standing electrode is CNT supported, flexible, and can be cut to the desired dimensions of a battery electrode. The self-standing electrode is optionally free of binder and optionally can be used without a metal-based current collector (typically alumina or copper depending on the electrode type).

In another example, a continuous production of composite comprising CNT/electrode active materials embedded in polymer can be achieved using a conveyor belt or a roll-to-roll system (FIG. 7B). The conveyor belt or roll-to-roll system allows continuous production of CNT supported self-standing electrode sheets for Li-ion battery that are embedded in the polymer based battery packaging film (FIG. 7A and FIG. 7B). As depicted in FIG. 7A, carbon nanotubes produced in reactor 10A and aerosolized electrode active materials, e.g. $LiNiMnCoO_2$ or graphite flakes, generated in reactor 10B are introduced to the mixer 27. The blended CNT/aerosolized active materials in the mixer 27 are directly deposited onto movable polymer particles attached on the conveyor belt or the roll-to-roll system (FIG. 7B). In one example, a furnace may be attached or coupled to the conveyor belt or the roll-to-roll system to heat CNT/active material/polymers composite. Upon heating, the furnace temperature is controlled to be near the melting point of the polymers and therefore, the mixture of CNT/electrode active materials is embedded in the melted polymer layer to form CNT supported, self-standing electrode composite. The CNT supported self-standing electrode composite may take the form of single uniform layer having CNT/electrode active material embedded in the polymer or the form of multiple layers, e.g. a sandwich structure having a polymer layer, a layer of CNT/electrode active material embedded in the polymer, and a layer of CNT/electrode active material without the polymer. (See FIG. 7B). The electrode composite materials can be further treated, for example, by pressing and casting, to increase the density of the self-standing electrode. The self-standing electrode is CNT-supported, flexible, and can be cut to the desired dimensions of a battery electrode. The self-standing electrode is optionally free of binder and optionally can be used without a metal-based current collector (typically alumina or copper depending on the electrode type).

The movable polymer particles may be rendered movable by any suitable means known to those of ordinary skill in the art. In some embodiments, the movable polymer particles may be polymer particles attached to a conveyor belt or a roll-to-roll system (FIG. 7B). The rate of motion of the movable polymer particles may be controllable, such as by a computer or manually by an operator. Control of the rate of motion may enable or facilitate control of the thickness of the composite obtained. Suitable polymer particles provide surfaces, on which a mixture of electrode active material and CNT can be deposited. One example of roll-to-roll system is horizontal belt filter system.

Figure 8:
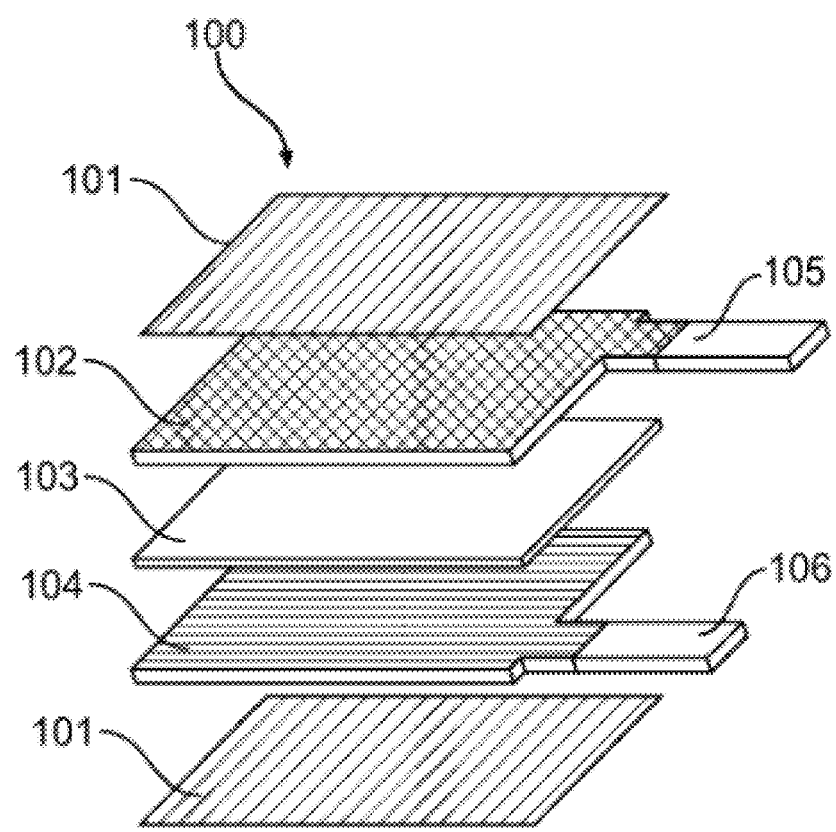
FIG. 8 shows a schematic view of single-cell configuration of batteries according to some aspects of the present disclosure.

In some aspects, the CNT supported self-standing electrodes synthesized according to the present disclosure can be used to manufacture Li-ion batteries. FIG. 8 delineates a schematic of a battery having a single cell configuration. In one example, a first packaging layer 101 is adjacent to an anode layer 102, which comprises carbon nanotubes and graphite. Anode layer 102 is adjacent to a separator layer 103, which is adjacent to a cathode layer 104, which comprises carbon nanotubes and LiMeOx. Cathode layer 104 is adjacent to a second packaging layer 101. The anode layer 102 and/or the cathode layer 104 may be configured to include a point of attachment for a battery tab 105/106. It is to be understood that a battery tab can be included in embodiments of the self-standing electrodes that are used without a metal-based current collector. According to some aspects of the present disclosure, the CNT supported self-sustaining electrodes are embedded in polymer based packaging material, which eliminates the need to have separate packaging layers in a battery, such as layers 101 in FIG. 8. Therefore, according to the present disclosure, the CNT supported self-standing electrodes embedded in polymer based packaging film are suitable for making wearable and flexible batteries, wherein the melted packaging polymers integrated in the electrodes provides mechanical flexibility and sustainability under various stresses that arise because of human activities. Even further, the separate packaging layers 101 as shown in FIG. 8 can be removed from the battery, and the resulting simplified battery can still maintain the same desirable properties.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

As used herein, the terms "nanotube", "nanofiber", and "nanostucture" refers to a structure having at least one dimension on the nanoscale, that is, at least one dimension between about 0.1 and 100 nm. It should be understood that "nanostructures" include, but are not limited to, nanosheets, nanotubes, nanofibers, nanoparticles, nanospheres, nanocubes, and combinations thereof. A nanofiber may comprise a fiber having a thickness on the nanoscale. A nanotube may comprise a tube having a diameter on the nanoscale. A nanoparticle may comprise a particle wherein each spatial dimension thereof is on the nanoscale.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

Moreover, all references throughout this application, for example patent documents including issued or granted patents or equivalents; patent application publications; and non-patent literature documents or other source material; are hereby incorporated by reference herein in their entireties, as though individually incorporated by reference.

What is claimed is:

1. A method of making an embedded electrode, the method comprising:
providing a bed of polymer particles that extends from a first side to a second side;
depositing a mixture on the first side of the bed of polymer particles to form a self-standing electrode, wherein the mixture comprises:
(a) nanotubes and/or nanofibers, and
(b) an active electrode material, and
treating at least a portion of the polymer particles to form a flexible solid body, wherein a portion of the self-standing electrode is embedded in the flexible solid body to form an embedded electrode.

2. The method of claim 1, wherein at least a portion of the self-standing electrode penetrates the first side of the bed of polymer particles.

3. The method of claim 1, wherein the self-standing electrode includes a first side and a second side, wherein the second side of the self-standing electrode is embedded in the flexible solid body and the first side of the self-standing electrode extends outward from the flexible solid body.

4. The method of claim 3, wherein the self-standing electrode comprises the active electrode material distributed throughout an interlinked nanotube network, and a portion of the interlinked nanotube network is embedded in the flexible solid body.

5. The method of claim 1, further comprising:
fluidizing the mixture with a gas or gas mixture, wherein the gas flows through the bed of polymer particles when the mixture is deposited on the first side of the bed of polymer particles to form the self-standing electrode.

6. The method of claim 1, wherein the mixture includes a carrier liquid, wherein the liquid flows through the bed of polymer particles when the mixture is deposited on the first side of the bed of polymer particles to form the self-standing electrode.

7. The method of claim 1, further comprising:
providing a porous substrate, wherein the second side of the bed of polymer particles is positioned on the porous substrate.

8. The method of claim 7, further comprising:
fluidizing the mixture with a gas or gas mixture, wherein the gas flows through the bed of polymer particles and the porous substrate when the mixture is deposited on the first side of the bed of polymer particles to form the self-standing electrode.

9. The method of claim 7, wherein the mixture includes a carrier liquid, wherein the liquid flows through the bed of polymer particles and the porous substrate when the mixture is deposited on the first side of the bed of polymer particles to form the self-standing electrode.

10. The method of claim 1, further comprising:
densifying the self-standing electrode after forming the flexible solid body.

11. The method of claim 1, wherein the nanotubes are carbon nanotubes and further comprising providing the nanotubes from a carbon nanotube synthesis reactor.

12. The method of claim 11, wherein the carbon nanotubes are single-walled, multi-walled, or combinations thereof.

13. The method of claim 1, wherein the active electrode material is selected from graphite, hard carbon, lithium metal oxides, and lithium iron phosphate.

14. The method of claim 13, wherein the active electrode material comprises graphite.

15. The method of claim 13, wherein the active electrode material comprises a lithium metal oxide.

16. The method of claim 15, wherein the active electrode material comprises $LiNiMnCoO_2$.

17. The method of claim 1, wherein the treating comprises heating.

18. The method of claim 17, wherein the heating forms a flexible solid body from the polymer particles.

19. The method of claim 18, wherein the polymer particles are at least partially melted by the heating.

20. The method of claim 1, wherein the embedded electrode is free of binder or metal-based current collector.

21. The method of claim 1, wherein the depositing the mixture does not significantly degrade aspect ratio of the nanotubes or nanofibers.

22. A continuous method of making an embedded electrode, the method comprising:
continuously providing a bed of polymer particles that extends from a first side to a second side;
continuously depositing a mixture on the first side of the bed of polymer particles to form a self-standing electrode, wherein the mixture comprises:
(a) nanotubes and/or nanofibers, and
(b) an active electrode material, and
continuously treating at least a portion of the polymer particles to form a flexible solid body, wherein a portion of the self-standing electrode is embedded in the flexible solid body to continuously form an embedded electrode.

23. The method of claim 22, wherein at least a portion of the self-standing electrode penetrates the first side of the bed of polymer particles.

24. The method of claim 22, wherein the second side of the bed of polymer particles is in contact with a conveyor belt or a roll-to-roll system.

25. The method of claim 22, further comprising continuously providing the nanotubes from a carbon nanotube synthesis reactor.

26. The method of claim 22, wherein the active electrode material is selected from graphite, hard carbon, lithium metal oxides, and lithium iron phosphate.

27. The method of claim 26, wherein the active electrode material comprises graphite.

28. The method of claim 26, wherein the active electrode material comprises a lithium metal oxide.

29. The method of claim 28, wherein the active electrode material comprises $LiNiMnCoO_2$.

30. The method of claim 25, wherein the nanotubes are single-walled or multi-walled.

31. The method of claim 22, wherein the embedded electrode is free of binder or metal-based current collector.

32. The method of claim 22, wherein the continuously depositing the mixture comprises distributing an aerosolizing gas through a bed of the active electrode material, in an aerosolizing reactor, to produce an aerosolized active electrode material.

* * * * *